(12) United States Patent
Kim et al.

(10) Patent No.: US 10,114,552 B2
(45) Date of Patent: Oct. 30, 2018

(54) MEMORY SCHEDULING METHOD FOR CHANGING COMMAND ORDER AND METHOD OF OPERATING MEMORY SYSTEM

(71) Applicant: Samsung Electronics Co., Ltd., Suwon-si, Gyeonggi-do (KR)

(72) Inventors: Byung-gook Kim, Hwaseong-si (KR); Young-bong Kim, Seoul (KR); Seung-hwan Ha, Seoul (KR); Sang-hoon Yoo, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 70 days.

(21) Appl. No.: 15/222,209

(22) Filed: Jul. 28, 2016

(65) Prior Publication Data

US 2017/0102884 A1  Apr. 13, 2017

(30) Foreign Application Priority Data

Oct. 8, 2015 (KR) ......................... 10-2015-0141692

(51) Int. Cl.
G06F 12/00 (2006.01)
G06F 13/00 (2006.01)
G06F 3/06 (2006.01)

(52) U.S. Cl.
CPC .......... G06F 3/0608 (2013.01); G06F 3/0613 (2013.01); G06F 3/0652 (2013.01); G06F 3/0659 (2013.01); G06F 3/0679 (2013.01)

(58) Field of Classification Search
CPC ......... G06F 2212/7205; G06F 12/0253; G06F 12/0269; G06F 12/0276

USPC ................... 711/E12.009, E12.011, E12.012
See application file for complete search history.

(56) References Cited

U.S. PATENT DOCUMENTS

| | | | |
|---|---|---|---|
| 7,890,550 B2 | 2/2011 | Jung et al. | |
| 7,996,446 B2 | 8/2011 | Bacon et al. | |
| 8,046,544 B2 | 10/2011 | Click, Jr. et al. | |
| 8,417,878 B2 | 4/2013 | Goss et al. | |
| 8,799,561 B2 | 8/2014 | Bux et al. | |
| 2008/0195799 A1 | 8/2008 | Park | |
| 2012/0191936 A1 | 7/2012 | Ebsen et al. | |
| 2014/0059279 A1* | 2/2014 | He | G06F 12/0246 711/103 |
| 2014/0173183 A1* | 6/2014 | Shin | G06F 12/0246 711/103 |
| 2016/0077745 A1* | 3/2016 | Patel | G06F 3/0608 714/704 |

(Continued)

FOREIGN PATENT DOCUMENTS

| | | |
|---|---|---|
| KR | 10-0876084 B1 | 12/2008 |
| KR | 10-1392174 B1 | 5/2014 |

*Primary Examiner* — Sean D Rossiter
(74) *Attorney, Agent, or Firm* — Harness, Dickey & Pierce, P.L.C.

(57) ABSTRACT

Disclosed is a method of operating a memory system which executes a plurality of commands including a write command and a trim command. The memory system includes a memory device, which includes a plurality of blocks. The method further includes performing garbage collection for generating a free block, calculating a workload level in performing the garbage collection, and changing a command schedule based on the workload level.

15 Claims, 29 Drawing Sheets

(56) References Cited

U.S. PATENT DOCUMENTS

| | | | |
|---|---|---|---|
| 2016/0188410 A1* | 6/2016 | Lee | G06F 11/1088 |
| | | | 714/6.24 |
| 2016/0313943 A1* | 10/2016 | Hashimoto | G06F 3/061 |
| 2016/0350214 A1* | 12/2016 | Payer | G06F 12/0269 |
| 2017/0010815 A1* | 1/2017 | Sprouse | G06F 3/0604 |
| 2017/0024276 A1* | 1/2017 | Kanno | G06F 11/1008 |
| 2017/0235673 A1* | 8/2017 | Patel | G06F 12/0253 |
| | | | 711/159 |
| 2017/0242790 A1* | 8/2017 | O'Krafka | G06F 3/0604 |
| 2017/0351603 A1* | 12/2017 | Zhang | G06F 12/0246 |

* cited by examiner

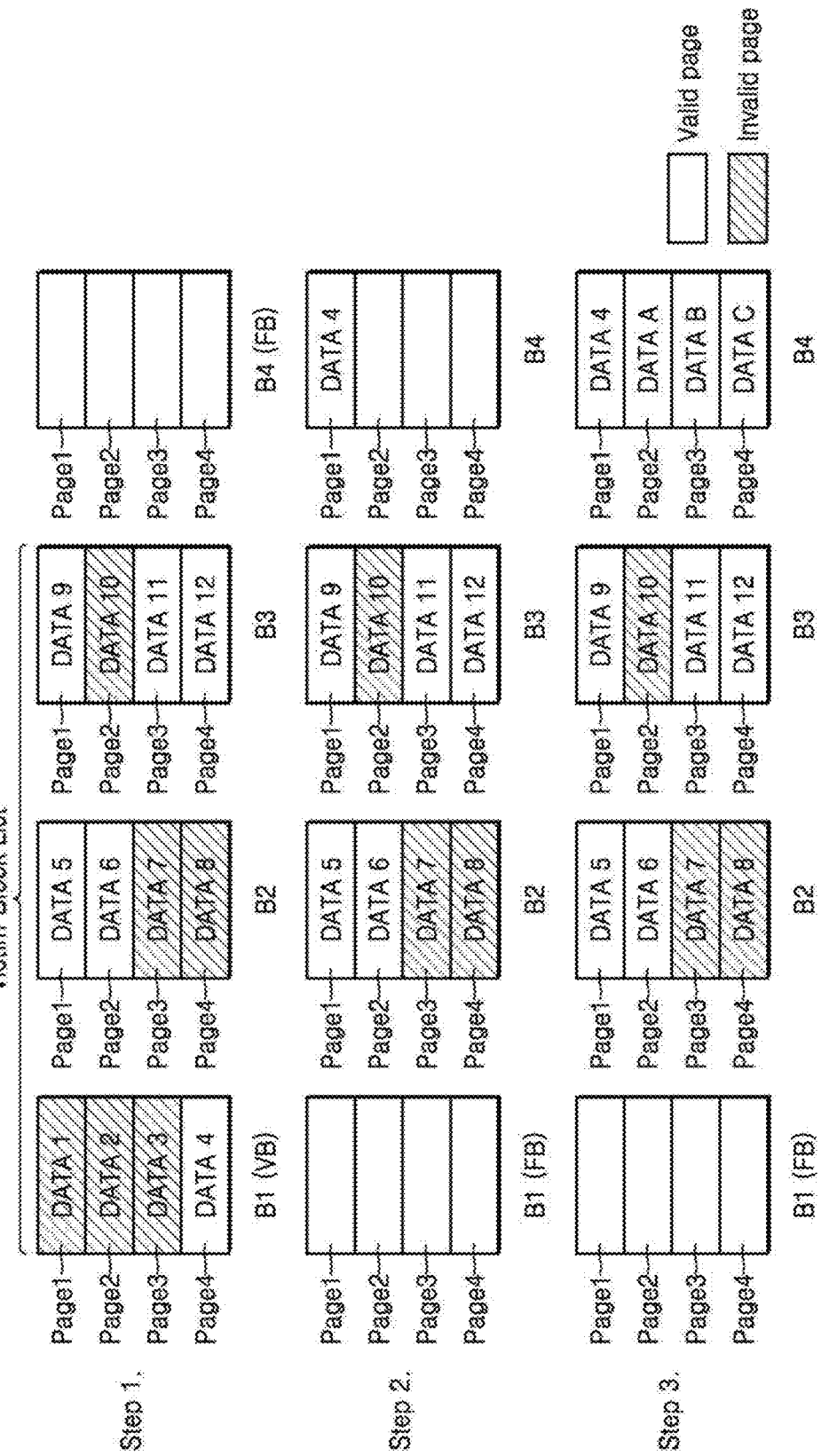

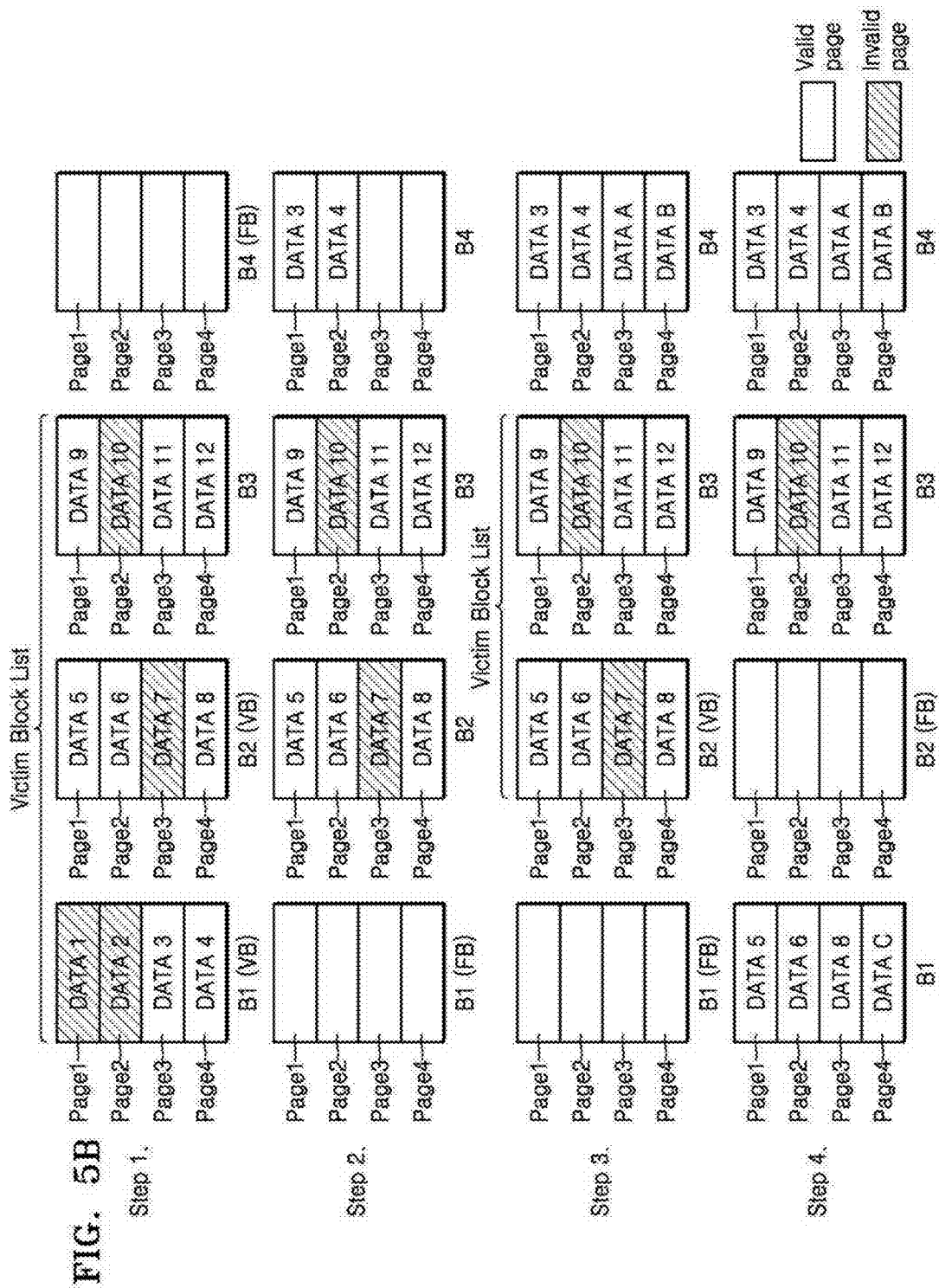

MEMORY SCHEDULING METHOD FOR CHANGING COMMAND ORDER AND METHOD OF OPERATING MEMORY SYSTEM

CROSS-REFERENCE TO RELATED APPLICATION

This application claims priority under 35 U.S.C. § 119(a) to Korean Patent Application No. 10-2015-0141692, filed on Oct. 8, 2015, in the Korean intellectual Property Office (KIPO), the disclosure of which is incorporated herein in its entirety by reference.

BACKGROUND

1. Field

Inventive concepts relate to memory scheduling methods and/or methods of operating memory systems, and more particularly, to memory scheduling methods and/or methods of operating memory systems, which perform efficient garbage collection.

2. Description of Related Art

A memory system (for example, a flash memory system) is a nonvolatile memory device, and is widely applied to universal serial bus (USB) drives, digital cameras, mobile phones, smartphones, tablet personal computers (PCs), memory cards, solid state drives (SSDs), etc. In flash memory devices, a read/write unit and an erase unit differ, and thus, a memory operation is managed by a flash transition layer (FTL), which may include firmware.

In the flash memory system, data is written in a block (for example, a free block) having an erase state, and in writing data, when there is no free block or the free block is small, garbage collection may be performed for securing one or more free blocks. However, as the number of valid pages of at least one victim block for which garbage collection is to be performed increases, the efficiency of the garbage collection is reduced.

SUMMARY

Inventive concepts provide a memory scheduling methods and/or methods of operating memory systems, which perform efficient garbage collection.

According to an example embodiment of inventive concepts, there is provided a method of operating a memory system, wherein the method comprising performing garbage collection on a plurality of blocks for securing a free block; calculating a workload level for the performing garbage collection; and changing a command schedule based on the calculated workload level.

According to another example embodiment, there is provided a memory scheduling method comprising, changing a first command schedule to a second command schedule based on a workload level, the workload level calculated when performing a first garbage collection; and scheduling execution of a plurality of commands based on the second command schedule.

According to an example embodiment of inventive concepts, a method of operating a memory system may comprise, reducing a number of valid pages associated with a plurality of blocks prior to performing garbage collection on the plurality of blocks, the reducing may include executing a command to change valid data to invalid data in the plurality of blocks.

BRIEF DESCRIPTION OF THE DRAWINGS

The foregoing and other features of example embodiments of inventive concepts will be more clearly understood from the following detailed description taken in conjunction with the accompanying drawings in which like reference characters refer to like parts throughout the different views. The drawings are not necessarily to scale, emphasis instead being placed upon illustrating principles of inventive concepts. In the drawings:

FIGS. 5A to 5C are diagrams for describing an operation of calculating a workload level, by the workload calculator;

DESCRIPTION OF EXAMPLE EMBODIMENTS

Hereinafter, example embodiments of inventive concepts will be described in detail with reference to the accompanying drawings. Example embodiments of inventive concepts are provided so that this disclosure will be thorough and complete, and will fully convey the concept of inventive concepts to one of ordinary skill in the art.

Figure 1:
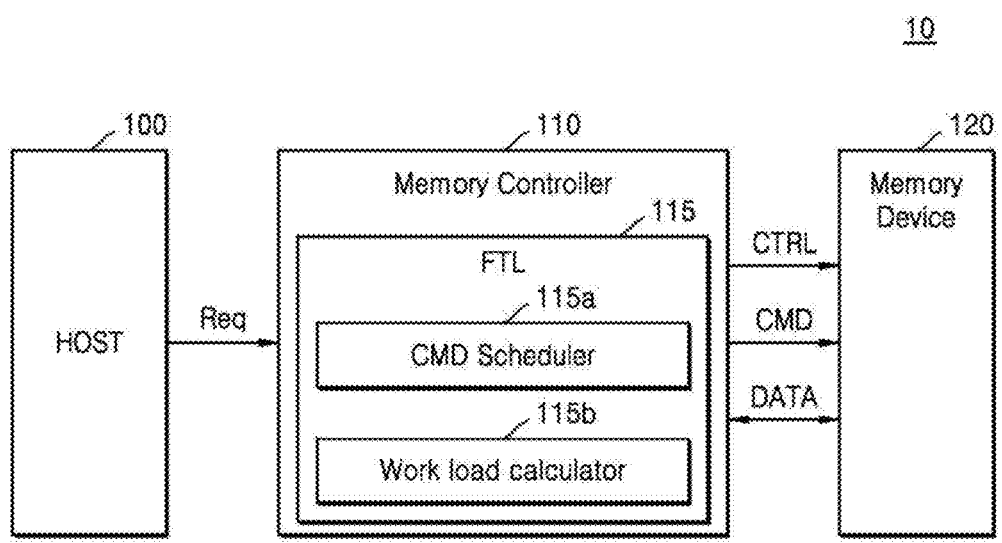
FIG. 1 is a block diagram illustrating a memory system according to an example embodiment.

FIG. 1 is a block diagram illustrating a memory system 10 according to an example embodiment. The memory system 10 may include a host 100, a memory controller 110, and a memory device 120. In an example embodiment, the memory device 120 may be a nonvolatile memory device that stores data. For example, the memory device 120 may be a flash memory device that includes a plurality of flash memory cells. Alternatively, the memory device 120 may be a memory device, which includes a plurality of resistive memory cells, such as including but not limited to a resistive random access memory (ReRAM), a magneto resistive random access memory (MRAM), a phase-change random access memory (PRAM), or the like. Hereinafter, in describing example embodiments, the memory device 120 is assumed as a flash memory device, which includes a plurality of NAND or NOR flash memory cells.

In response to a write, read, or trim request from the host 100, the memory controller 110 may control the memory device 120 to write data in the memory device 120, read data stored in the memory device 120, or change valid data to invalid data, which is stored in the memory device 120. For example, the memory controller 110 may supply a command CMD and a control logic CTRL to the memory device 120 to control a program (or write) operation, a read operation, an erase operation, and a trim operation, which are performed for the memory device 120. Also, data DATA to be read and the read data DATA may be transmitted and received between the memory controller 110 and the memory device 120.

To describe the trim operation, when an arbitrary file is erased from an upper level (i.e., a host side) by an application program of the host 100, the arbitrary file may be treated as a file that has been erased by a file system of the host 100. In an example embodiment, the host 100 may supply a trim request and address information of data, which is to be erased, to the memory controller 110 so as to erase data corresponding to the arbitrary file. In response to the trim request, the memory controller 110 may execute a trim command, generated for performing the trim operation, in background trim in a second priority after a priority of another command. In executing the trim command, the memory controller 110 may change data that corresponds to the arbitrary file to invalid data. The invalid data may be erased through garbage collection, which is to be performed later and further discussed in detail below.

Still referring to FIG. 1, the memory controller 110 may include a flash transition layer (FTL) 115. The FTL 115 may include system software (or firmware) that manages the write, read, erase, and trim operations of the flash memory device, and may be loaded into a working memory (not shown), which is included in the memory controller 110. The firmware included in the FTL 115 may be driven by a processor (not shown) included in the memory controller 110.

The FTL 115 may change a logical address to a physical address according to a data access request from the host 100, and may supply the physical address to the memory device 120. Also, the FTL 115 may perform a manage operation on various cell areas (for example, a chip, a block, a page, and/or the like) included in the memory cell array 120, and for example, may perform garbage collection and a bad block managing operation on a plurality of blocks of the memory cell array (not shown) included in the memory device 120.

Moreover, the HT 115 may include a command scheduler 115a and a workload calculator 115b. The memory controller 110 may receive a write request, a read request, and a trim request from the host 100 and may supply a plurality of commands, respectively corresponding to the received requests, to the memory device 120. In an example embodiment, the command scheduler 115a may schedule the plurality of commands according to a command scheduling method in order for the plurality of commands to be efficiently executed. The command scheduling method may denote that a command is scheduled based on at least one of a priority of command executions and a quota of command execution. The quota of command execution may denote at least one of the amount of data, which is processed when one command is executed. And, the number of successive executions of the same command, which is continuously executed, may denote among a plurality of commands. The command scheduler 115a may change a command scheduling method, based on a workload level to be described below. That is, the command scheduler 115a may change at least one of a priority of command executions and a quota of command execution, which are a criterion for scheduling a command. Changing a quota of command execution may denote changing at least one of the amount of data, which is processed when one command is executed, and the number of successive executions of the same command, which is continuously executed, among a plurality of commands.

Still referring to FIG. 1, the workload calculator 115b may calculate a workload level in an operation for performing garbage collection. The workload calculator 115b may calculate the workload level at a certain period as well as when performing garbage collection. In an example embodiment, the workload calculator 115b may calculate the valid page ratio of blocks for a victim block list or number of valid pages of blocks for a victim block list, which is generated for selecting at least one victim block for which garbage collection is to be performed. The workload calculator 115b may calculate the workload level based on the calculated valid page ratio or number, and may treat the calculated valid page ratio or number as the workload level. In another example embodiment, the workload calculator 115b may calculate the ratio or number of the non-free blocks instead of the free blocks among a plurality of blocks included in the memory device 120. The workload calculator 115b may calculate the workload level based on the calculated ratio or number of the non-free blocks, and may treat the calculated ratio or number of the non-free blocks as the workload level.

The victim block list may be generated before the workload calculator 115b calculates the valid page ratio. And, the workload calculator 115b may calculate the valid page ratio of blocks for a victim block list. For example, in FIG. 5A the valid page ratio of blocks for the victim block list is 6/12 because the total number of pages of blocks for the victim block list is 12, and the total number of valid pages of blocks for the victim block list is 6. As such, the valid page ratio and the invalid page ratio may be defined based on the number of pages of blocks for the victim block list.

However, this is merely an example embodiment, and the example embodiments are not limited thereto. In other example embodiments, the workload calculator 115b may calculate the workload level based on the invalid page ratio or number of blocks for the generated victim block list, and may calculate the workload level based on the ratio or number of free blocks among the plurality of blocks included in the memory device 120. In an another example embodiment, the workload calculator 115b may calculate the valid page ratio and the non-free block ratio, and may calculate the workload level based on the calculated valid page ratio and the calculated non-free block ratio.

Hereinafter, for convenience of description, it is assumed that a workload level corresponds to a calculated valid page ratio or a calculated non-free block ratio.

Still referring to FIG. 1, the command scheduler 115a may change a command scheduling method based on the workload level calculated by the workload calculator 115b, thereby reducing a valid page ratio of a victim block in an operation of performing garbage collection. In an example embodiment, the command scheduler 115a may change a command scheduling method for a trim command to change valid data to invalid data before garbage collection is performed, and thus, thereby reducing the valid page ratio.

Therefore, garbage collection is efficiently performed, and the performance of the memory system 10 is enhanced.

The memory cell array (not shown) included in the memory device 120 may include a meta area, where metadata is stored, and a storage area where normal data such as valid data is stored. The meta area may store various information for managing data stored in the storage area. And, for example, mapping information of a logical address and a physical address may be nonvolatilely stored in the meta area.

The memory controller 110 and the memory device 120 may be integrated into one semiconductor device. That is, for example, the memory controller 110 and the memory device 120 may be integrated into one semiconductor device to configure a memory card. For example, the memory controller 110 and the memory device 120 may be integrated into one semiconductor device to configure including but not limited a PC card (PCMCIA), a compact flash card (CF), a smart media card (SM/SMC), a memory stick, a multimedia card (MMC, RS-MMC, or MMCmicro), an SD card (SD, miniSD, or microSD), a universal flash memory device (UFS) or the like. According to an example embodiment, the memory controller 110 and the memory device 120 may be integrated into one semiconductor device to configure a solid state disk/drive (SSD).

Figure 2:
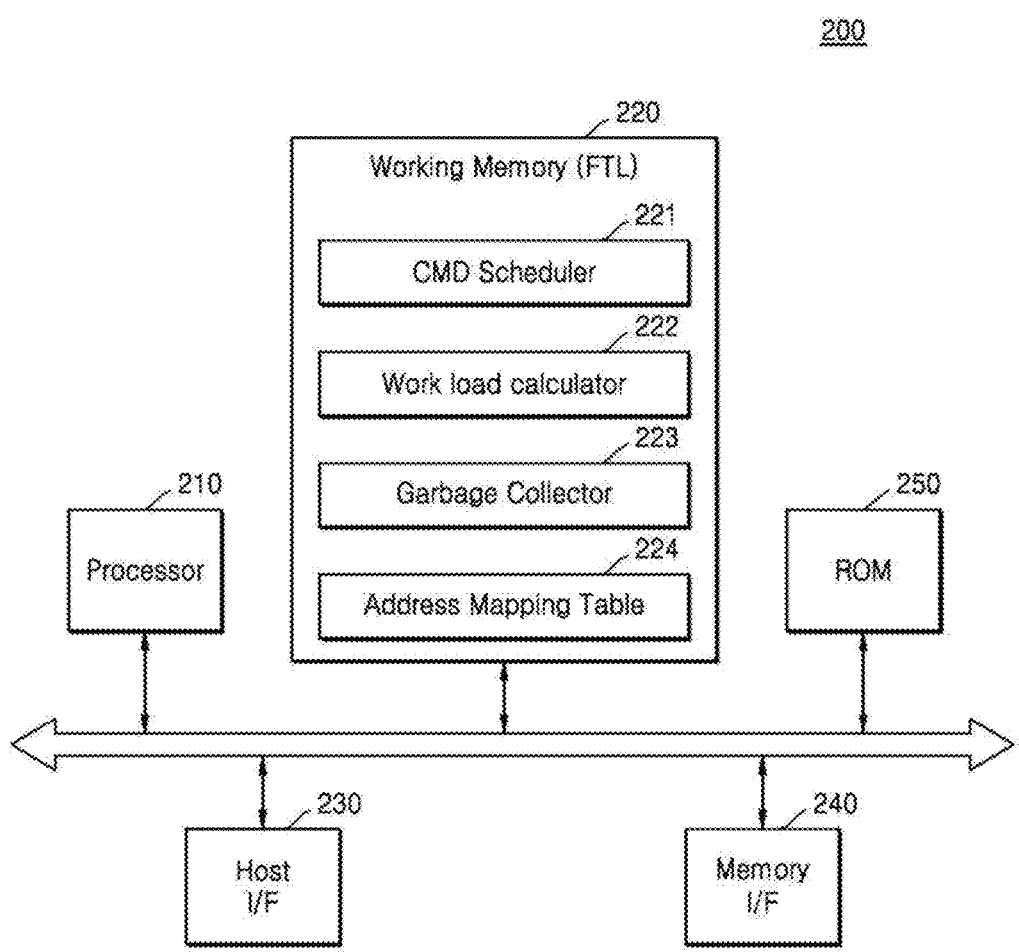
FIG. 2 is a block diagram illustrating an implementation example of a memory controller according to an example embodiment.

FIG. 2 is a block diagram illustrating an example embodiment of a memory controller 200. Referring to FIG. 2, the memory controller 200 may include at least a processor 210, a working memory 220, a host interface 230, a memory interface 240, and a read-only memory (ROM) 250. The above-described FTL may be loaded into the working memory 220. The FTL may include firmware, and based on a function implemented by the firmware, the FTL may include a command scheduler 221, a workload calculator 222, a garbage collector 223, and an address mapping table 224.

Although not shown in FIG. 2, the memory controller 200 may further include various elements in addition to the above-described elements That is, for example, the memory controller 200 may further include a buffer memory that temporarily stores data which is written or read, a buffer controller for controlling the buffer memory, a command generator (not shown) that generates a command CMD for controlling a memory operation according to a request from a host, and a command queue that stores a plurality of generated commands.

The processor 210 may include a central processor (CPU), a microprocessor, or the like. The processor 210 may control an overall operation of the memory controller 200. The processor 210 may drive firmware loaded into the working memory 220 for controlling the memory controller 200. The memory controller 200 may communicate with an external host through various standard interfaces, and the host interface 230 may provide an interface between the host and the memory controller 200. The standard interface may include various interface types such as advanced technology attachment (ATA), serial ATA (SATA), external SATA (e-SATA), small computer small interface (SCSI), serial attached SCSI (SAS), peripheral component interconnection (PCI), PCI express (PCI-E), IEEE 1394, universal serial bus (USB), secure digital (SD) card, multi-media card (MMC), embedded multi-media card (eMMC), universal flash memory device UFS), compact flash (CF) and/or the like.

Still referring to FIG. 2, the memory interface 240 may provide an interface for a memory device, and for example, written data and read data may be transmitted or received to and/or from the memory device through the memory interface 240. Also, the memory interface 240 may supply a command CMD and an address ADD to the memory device. Also, the memory interface 240 may receive various information from the memory device, and may supply the received information to the memory controller 200.

The working memory 220 may be implemented with various memories, and for example, may be implemented with at least one of including but not limited to a cache memory, a DRAM, an SRAM, a PRAM, and a flash memory device. The command scheduler 221 and the workload calculator 222 have been described above, and thus, their detailed descriptions are not repeated.

The garbage collector 223 may write one or more valid pages of a victim block in an arbitrary block so as to secure one or more free blocks, and may erase a victim block to which all valid pages have been moved, and thereby securing a free block. Also, the address mapping table 224 may store mapping information between a logical address from a host and a physical address, and thus indicating a physical location at which actual data is to be accessed based on the logical address. With reference to the mapping information, the logical address supplied from the host may be changed to a physical address indicating a physical location of a memory cell which is to be actually accessed. The address mapping table 224 may correspond to mapping information, which is stored in a meta area of the memory device. When a memory system is driven, the mapping information stored in the meta region of the memory device may be loaded into the address mapping table 224. The read only memory (ROM) 250 may store code data necessary for initial booting of a device to which the memory system is applied.

Figure 3:
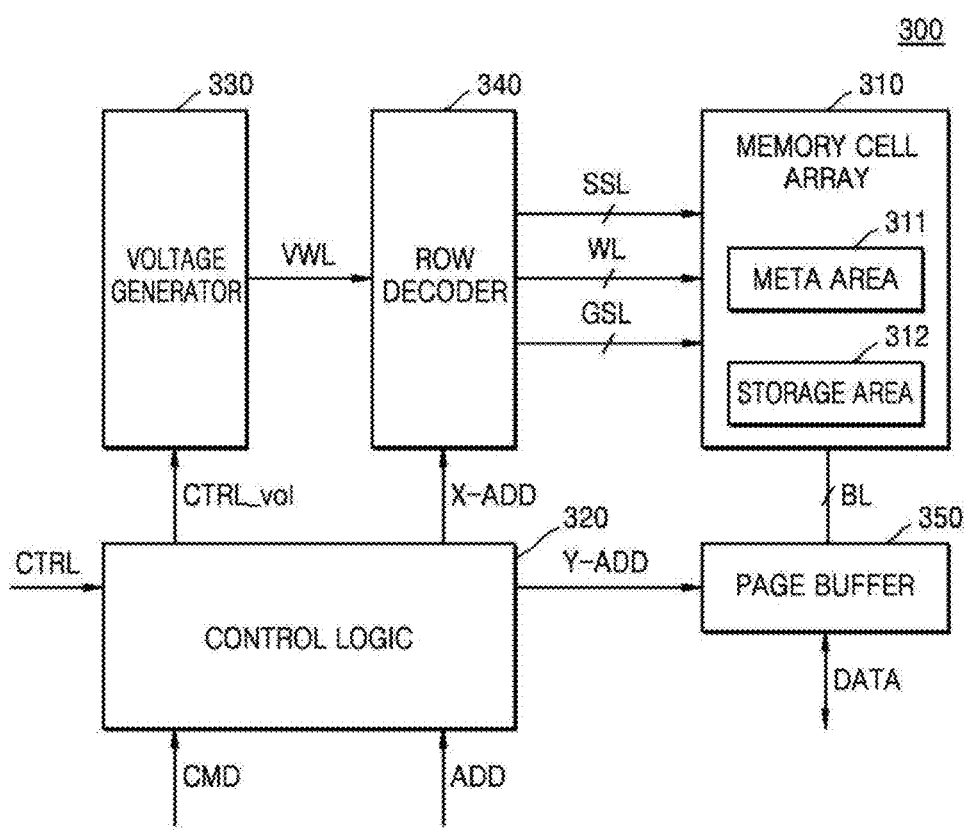
FIG. 3 is a block diagram illustrating an implementation example of a memory device according to an example embodiment.

FIG. 3 is a block diagram illustrating an example embodiment of a memory device 300. Referring to FIG. 3, the memory device 300 may include at least a memory cell array 310, a control logic 320, a voltage generator 330, a row decoder 340, and a page buffer 350. Although not shown, the memory device 300 may further include a data input/output circuit or an input/output interface.

The memory cell array 310 may include a meta area 311 storing metadata and a storage area 312 storing normal data. Each of the meta area 311 and the storage area 312 may include a plurality of memory cells. If the memory cell array 310 includes a plurality of flash memory cells, the memory cell array 310 may be connected to a plurality of word lines WL, a string selection line SSL, a ground selection line GSL, and a plurality of bit lines BL. In an example embodiment, the memory cell array 310 may be connected to the row decoder 340 through the word lines WL, the string selection line SSL, and the ground selection line GSL, and may be connected to the page buffer 350 through the bit lines BL.

Based on a command CMD, an address ADD, and a control signal. CTRL received from a memory controller, the control logic 320 may write data in the memory cell array 310, and/or may read the data from the memory cell array 310, and/or may output various internal control signals for performing a trim operation of erasing data stored in the memory cell array 310 or changing valid data, stored in the memory cell array 310, to invalid data.

The various control signals outputted from the control logic 320 may be supplied to the voltage generator 330, the row decoder 340, and the page buffer 350. In an example embodiment, the control logic 320 may supply a voltage control signal CTRL_vol to the voltage generator 330, supply a row address X-ADD to the row decoder 340, and supply a column address Y-ADD to the page buffer 350. However, the example embodiments are not limited thereto.

In another example embodiments, the control logic 320 may further supply other control signals to the voltage generator 330, the row decoder 340, and the page buffer 350.

Still referring to FIG. 3, according to an example embodiment, the meta area 311 may include a plurality of mapping tables. Based on control by the memory controller, the memory device 300 may copy valid pages, included in a victim block of the storage area 312, to a free block while garbage collection is being performed. Also, the plurality of mapping tables included in the meta area 311 may be updated based on a result of the garbage collection according to a control by the memory controller. In an operation of performing the garbage collection, an update operation may be performed for the meta area 311 a plurality of times. According to an example embodiment, by lowering a valid page ratio for each of the victim blocks before the garbage collection is performed, the garbage collection is efficiently performed, and undesired garbage collection is limited and/or prevented from being performed later.

Figure 4:
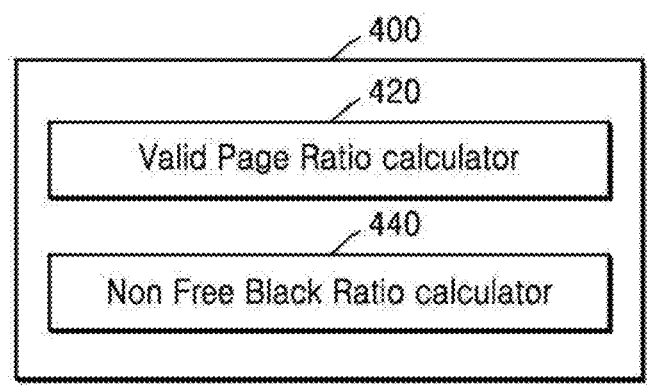
FIG. 4 is a block diagram illustrating a workload calculator according to an example embodiment.

FIG. 4 is a block diagram illustrating a workload calculator 400 according to an example embodiment.

As illustrated in FIG. 4, the workload calculator 400 may include a valid page ratio calculator 420 and a non-free block ratio calculator 440. As described above, the valid page ratio calculator 420 may calculate a valid page ratio for each of the blocks of a victim block list. The victim block list may be generated by detecting N (where N is a natural number) number of blocks in an ascending order of garbage collection costs of each block for selecting at least one victim block for which garbage collection is to be performed. In an example embodiment, the garbage collection costs may be calculated based on a valid data ratio of each block. However, this is merely an example embodiment, and the example embodiment is not limited thereto. As described above, the number of valid pages counted by the valid page ratio calculator 420 may correspond to a workload level.

Figure 5C:
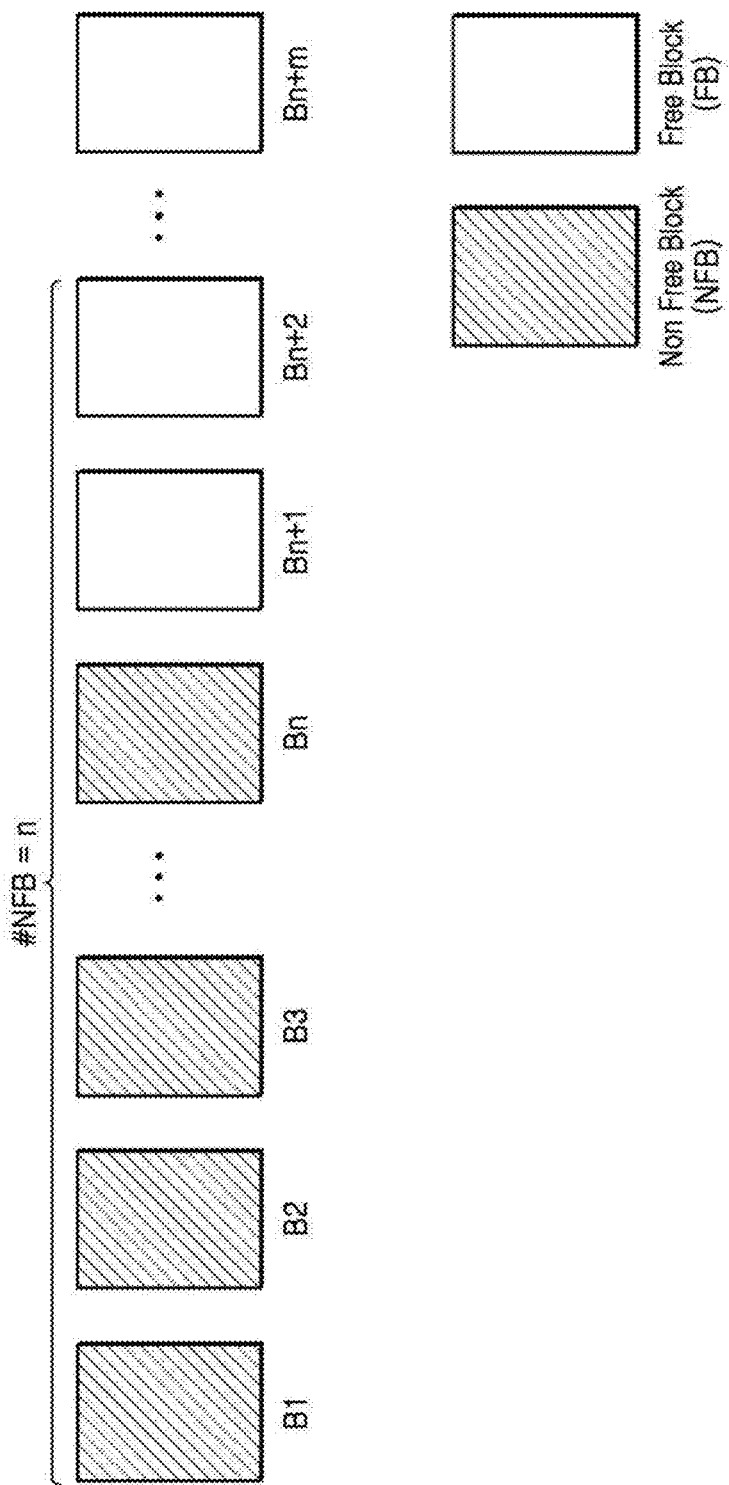

FIGS. 5A to 5C are diagrams for describing an operation of calculating a workload level by the workload calculator 400. In FIGS. 5A and 5B to be described below, it is assumed that a memory device includes first to fourth blocks, wherein each of the first to fourth blocks includes first to fourth pages, and data is stored in each of the four pages. This is merely an example embodiment, and the example embodiment is not limited thereto. It is obvious that the memory device includes a plurality of blocks, and each of the blocks stores pieces of page data.

Referring to FIG. 4 in conjunction with FIG. 5A, a case of executing a write command, which is generated in response to a request from a host for writing data A "DATA A", data B "DATA B", and data C "DATA C," in the memory device will be described below. In a first step "Step 1" and a second step "Step 2", as shown in FIG. 5A, before writing the data A "DATA A", the data B "DATA B", and the data C "DATA C" in blocks, garbage collection may be performed for securing a free block. That is, for example, in the first step "Step 1", a victim block list may be generated, and a first block "B1," which is the lowest in garbage collection cost because the first block among blocks of the victim block list stores the most invalid pages may be selected as a victim block "VB". In the second step "Step 2", valid data "DATA 4" stored in a valid page "Page4" of the first block "B1" selected as the victim block "VB" may be copied to a fourth block "B4" which is a free block "FB". Subsequently, the first block "B1" may be erased in units of one block and thus may be the free block "FB". In a third step "Step 3," the write command may be executed by writing the data A "DATA A", the data B "DATA B", and the data C "DATA C" in the fourth block "B4". The valid page ratio calculator 420 may calculate a valid page ratio of each of the blocks "B1 to 133" of the victim block list in performing the garbage collection, That is, for example, the total number of pages of the blocks "B1 to B3" may be twelve, and the number of valid pages may be six, whereby a valid page ratio may be calculated as 0.5. The calculated valid page ratio "0.5" may correspond to a workload level.

Referring to FIG. 4 in conjunction with FIG. 5B, similar to FIG. 5A, a case of executing a write command, which is generated in response to a request from the host for writing data A "DATA A," data B "DATA B," and data C "DATA C" in the memory device will be further described below. In a first step "Step 1" and a second step "Step 2," before writing the data A "DATA A," the data B "DATA B," and the data C "DATA C" in blocks, garbage collection may be performed for securing at least one free block. That is, for example, in the first step "Step 1", a victim block list may be generated, and a first block "B1" which is the lowest in garbage collection cost because the first block among blocks of the victim block list stores the most invalid pages may be selected as a victim block "VB".

In the second step "Step 2," valid data "DATA 3" and "DATA 4" stored in valid pages "Page3" and "Page4" of the first block "B1," respectively, are selected as the victim block "VB" may be copied to a fourth block "B4" which is a free block "FB". Subsequently, the first block "B1" may be erased in units of one block and thus may be the free block "FB". However, in a third step "Step 3," the write command may be executed by writing the data A "DATA A," the data B "DATA B," and the data C "DATA C" in the fourth block "B4;" however, since a remaining memory space of the fourth block "B4" is insufficient, the data C "DATA C" cannot be written in the fourth block "B4." As a result, in the third step "Step 3" and the fourth step "Step 4," before the data C "DATA C" is written, the garbage collection may be performed once more for securing at least one free block.

In the third step "Step 3," a victim block list may be generated, and a second block "B2" may be selected as a victim block "VB" In the fourth step "Step 4," valid data "DATA 5," "DATA 6" and "DATA 8" of valid pages "Page1", "Page2" and "Page4" of the second block "B2" may be copied to a first block "B4," which is a free block "FB." Also, the write command may be executed by writing data C "DATA C" in the first block "B1." The valid page ratio calculator 420 may calculate a valid page ratio of each of the blocks "B1 to B3" of the victim block list in performing the garbage collection. That is, for example, the total number of pages of the blocks "B1 to B3" may be twelve, and the number of valid pages may be seven, whereby a valid page ratio may be calculated as 0.583. The calculated valid page ratio "0.583" may correspond to a workload level.

As illustrated in FIG. 5B, a problem where additional garbage collection is performed according to a workload level occurs. That is, in an example embodiment where the workload level is equal to or higher than a reference level, for example, when a valid page ratio that is the workload level is equal to or higher than the reference level "0.583," additional garbage collection is performed, and thereby causing a reduction in performance of a memory system. Therefore, the workload calculator 400 according to an example embodiment may calculate a workload level corresponding to the valid page ratio and may change a command scheduling method of the memory system, based on the calculated workload level, and thereby limiting and/or preventing additional garbage collection from being performed. The reference level may indicate an example value, and another reference level may be set depending on an operating environment of the memory system.

Referring to FIG. 4 in conjunction with FIG. 5C, the non-free block ratio calculator 440 may count the number "n" of non-free blocks among a plurality of blocks "B1 to Bn+m" included in the memory device 120 of FIG. 1 to calculate a non-free block (NFB) ratio. The non-free block ratio may correspond to a workload level. When the non-free block ratio is equal to or higher than a reference level, there is a high possibility that additional garbage collection is performed as described above. Therefore, the workload calculator 400 according to an example embodiment may calculate a workload level equal to the valid page ratio, and may change a command scheduling method of the memory system, based on the calculated workload level, and thereby preventing and/or limiting additional garbage collection from being performed. However, this is merely an example embodiment. In other example embodiments, the number of non-free blocks counted by the non-free block ratio calculator 440 may correspond to a workload level.

Moreover, in another example embodiment, the workload calculator 400 may perform a combination operation and an arithmetic operation on the valid page ratio calculated by the valid page ratio calculator 420 and the non-free block ratio calculated by the non-free block ratio calculator 440 to calculate a workload level based on the valid page ratio and the non-free block ratio.

Figure 6:
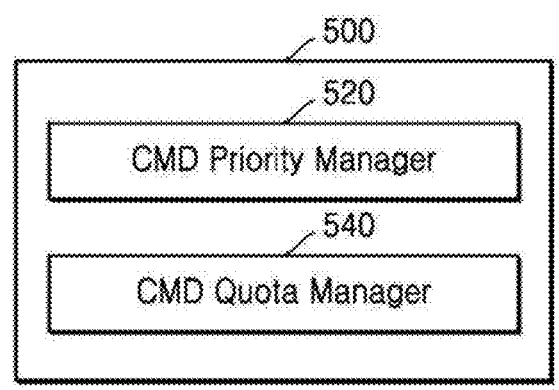
FIG. 6 is a block diagram illustrating a command scheduler according to an example embodiment.

FIG. 6 is a block diagram illustrating a command scheduler 500 according to an example embodiment.

As illustrated in FIG. 6, the command scheduler 500 may include a command priority manager 520 and a command quota manager 540. The command scheduler 500 may schedule a plurality of commands according to a command scheduling method in order for the plurality of commands to the efficiently executed. The command priority manager 520 may manage a priority of command execution corresponding to one factor of the command scheduling method. That is, for example, the command priority manager 520 may assign a first command execution priority to a write and read command, and may assign a second command execution priority to a trim command, thereby allowing the write and read command to be executed prior to the trim command. Also, the command priority manager 520 may change a priority of command execution based on a workload level. This will be described in further detail below with reference to FIGS. 7A to 7F. Moreover, the command quota manager 540 may manage a quota of command execution corresponding to one factor of the command scheduling method. The command quota manager 540 may change a quota of command execution based on a workload level. An operation, where the command quota manager 540 changes the amount of data that is to be processed in executing one command in a quota of command execution, will be described in further detail below with reference to FIGS. 8A to 8D. An operation, where the command quota manager 540 changes the number of successive executions of the same command to be successively performed among a plurality of commands in a quota of command execution, will be described in further detail below with reference to FIGS. 9A to 9D, FIGS. 7A to 7F are diagrams for describing an operation of changing a priority of command execution.

Figure 7A:
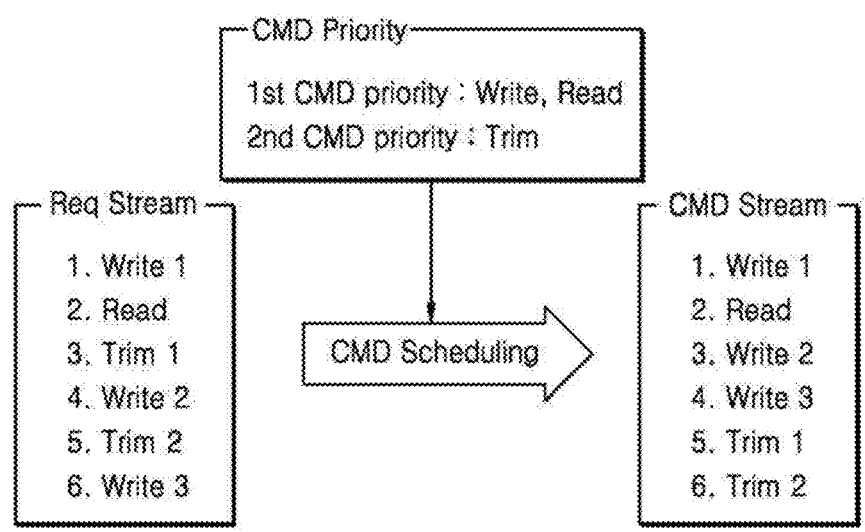
FIGS. 7A to 7F are diagrams for describing an operation of changing a priority of command execution.

Referring to FIG. 1 in conjunction with FIG. 7A, the memory controller 110 may receive a plurality of requests in the order of request streams "Req Stream" from the host 100. In an example embodiment, the memory controller 110 may sequentially receive a first write request "Write 1", a read request "Read", a first trim request "Trim 1", a second write request "Write 2", a second trim request "Trim 2", and a third write request "Write 3". A plurality of commands corresponding to the plurality of requests may be generated and stored in a command queue. The command scheduler 500 may schedule the plurality of commands according to a command scheduling method to supply the scheduled commands to the memory device 120 in the order of command streams "CMD Stream". In an example embodiment, the command scheduler 500 may schedule the commands according to a first command scheduling method. In a command execution priority "CMD Priority" of the first command scheduling method, as illustrated in FIG. 7A, a write and read command may have a first command execution priority "$1^{st}$ CMD priority," and a trim command may have a second command execution priority "$2^{nd}$ CMD priority." The first command scheduling method may correspond to a background trim method. Therefore, the command scheduler 500 may schedule the commands in order for the commands to be executed in the order of a first write command "Write 1," a read command "Read," a second write command "Write 2," a third write command "Write 3," a first trim command "Trim 1," and a second trim command "Trim 2" like a command stream "CMD Stream".

Figure 7B:
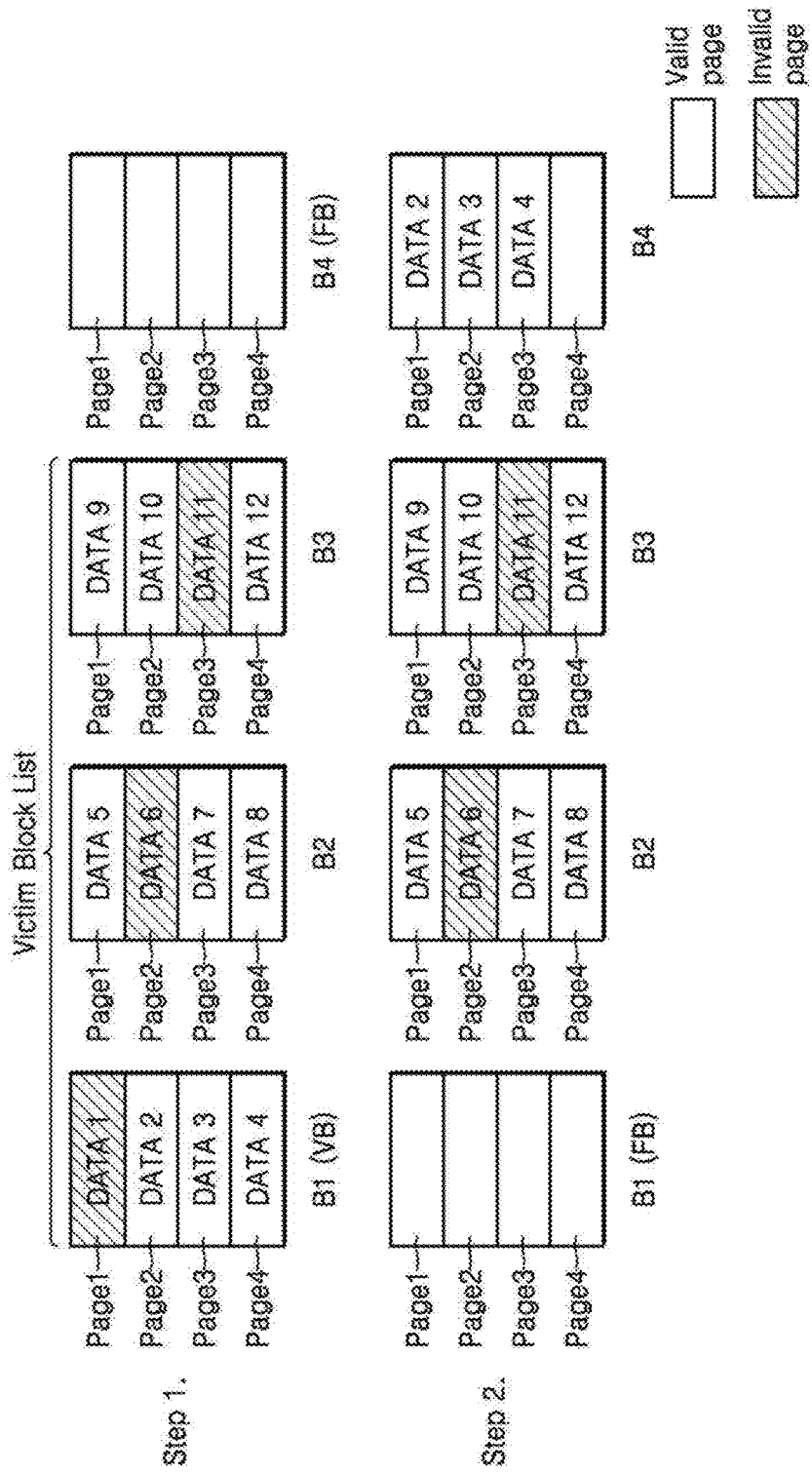

Referring to FIG. 7B, in a first step "Step 1" and a second step "Step 2," before executing a second write command "Write 2," garbage collection may be performed for securing at least one free block. That is, in the first step "Step 1," a victim block list may be generated, and a first block "B1" among blocks of the victim block list may be selected as a victim block "VB." In the second step "Step 2," valid data "DATA 2," "DATA 3" and "DATA 4" may be stored in valid pages "Page2," "Page3" and "Page4" of the first block "B1" selected as the victim block "VB," and may be copied to a fourth block "B4" which is a free block "FB".

Figure 7C:
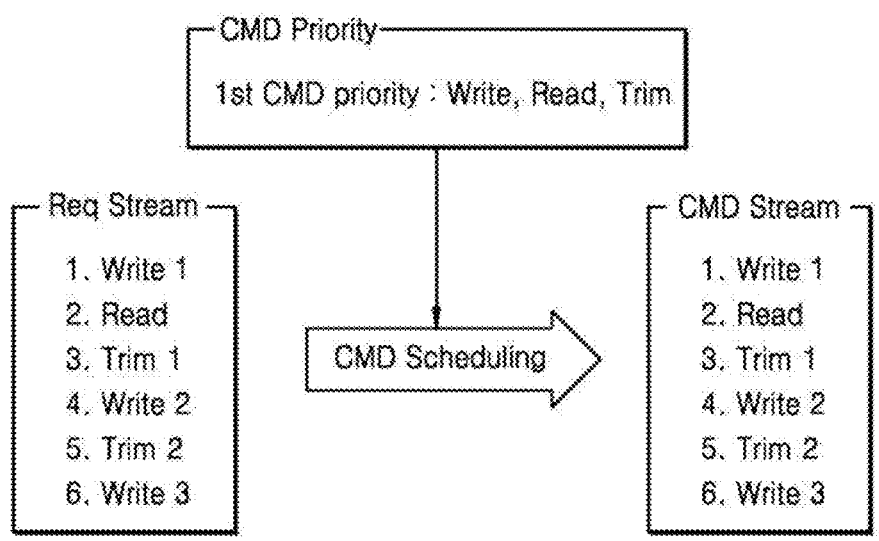

Referring to FIGS. 1, 6 and 7C, the command scheduler 500 may change the first command scheduling method to a second command scheduling method based on the above-described workload level. The command priority manager 520 may change a trim command execution priority to a first command execution priority "$1^{st}$ CMD priority". That is, for example, an execution priority of a trim command "Trim" may be equal to an execution priority of a write command "Write." In an example embodiment, the command scheduler 500 may schedule the commands according to the second command scheduling method. In a command execution priority "CMD Priority" of the second command scheduling method, as illustrated in FIG. 7C, a write command "Write," a read command "Read," and a trim command "Trim" may have the first command execution priority "$1^{st}$ CMD priority." Therefore, the command scheduler 500 may schedule the commands in order for the commands to be executed in the order of a first write command "Write 1," a read command "Read," a first trim command "Trim 1," a second write command "Write 2," a second trim command "Trim 2," and a third write command "Write 3" like a command stream "CMD Stream."

Figure 7D:
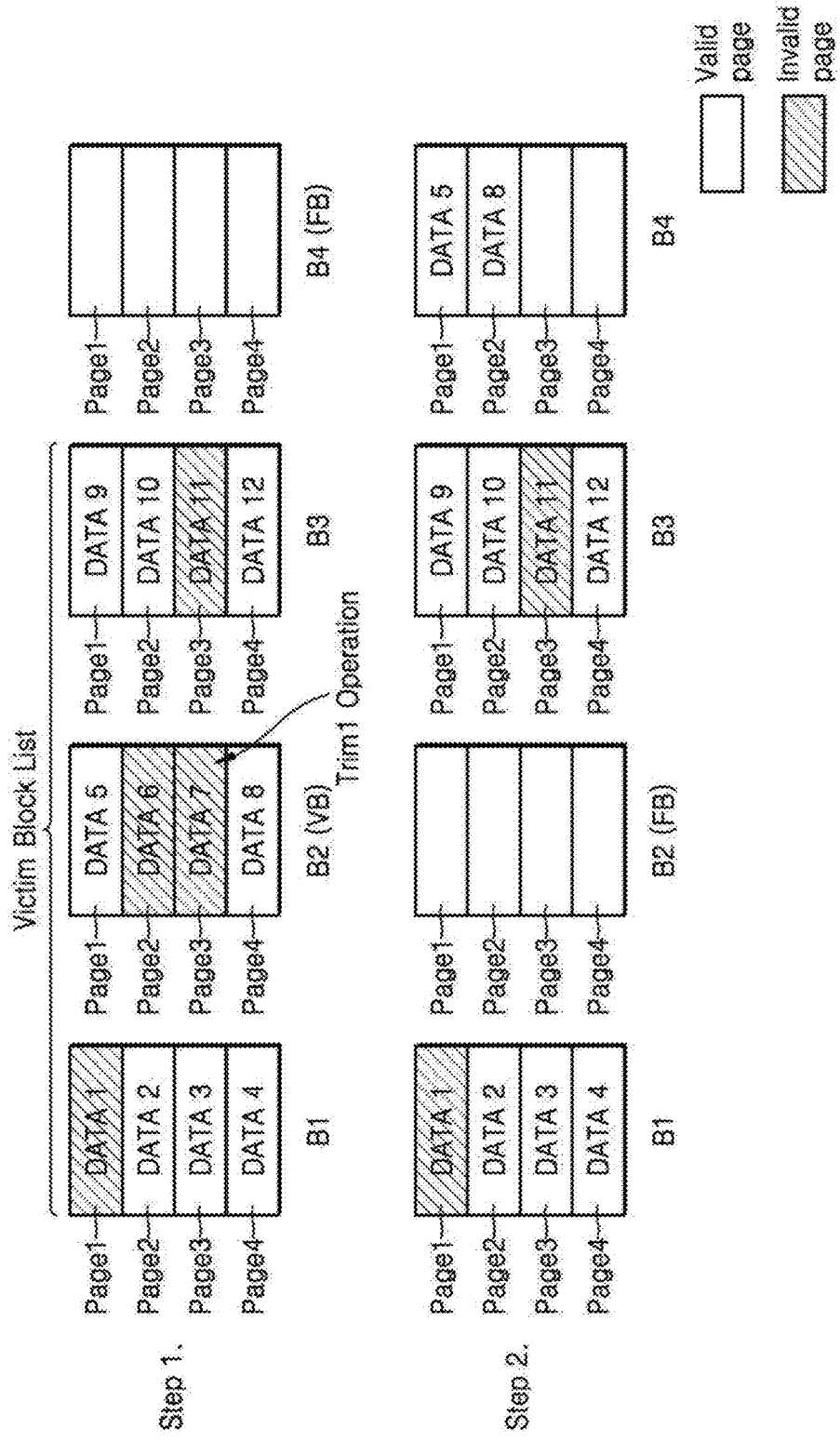

Referring to FIG. 7D, it is illustrated that in a first step "Step 1" and a second step "Step 2," before executing a second write command "Write 2," garbage collection may be performed for securing at least one free block. Unlike FIG. 7B, a third page "Page3" of a second block "B2" of FIG. 7D may be in a state where a page has been changed to an invalid page as an execution result of a first trim command "Trim 1." Therefore, in the first step "Step 1," a victim block list may be generated, and the second block "B2" among blocks of the victim block list may be selected as a victim block "VB." In the second step "Step 2," valid data "DATA 5" and "DATA 8" may be stored in valid pages "Page1" and "Page4" of the second block "B2" selected as the victim block "VB," and may be copied to a fourth block "B4" which is a free block "FB." As described above, valid data stored in three valid pages may be stored in a free block when the garbage collection of FIG. 7B is performed, but when the garbage collection of FIG. 7D is performed, the first trim command "Trim 1" may be executed prior to the second write command "Write 2." Accordingly, only valid data stored in two valid pages may be stored in the free block, and thus, garbage collection is efficiently performed.

Figure 7E:
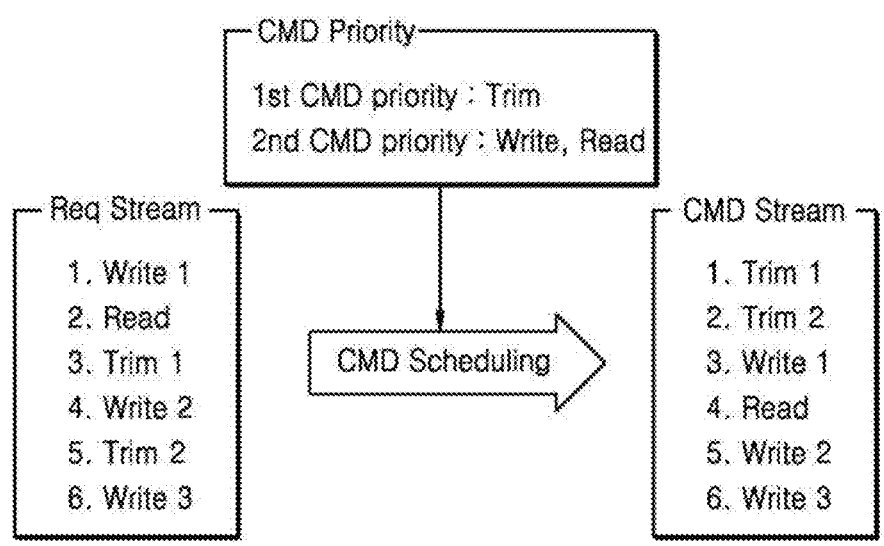

Referring to FIGS. 1, 6 and 7E, as described above with reference to FIG. 7C, the command scheduler 500 may change the first command scheduling method to the second command scheduling method, based on the above-described workload level. However, unlike FIG. 7C, the command priority manager 520 may change a trim command execution priority to a first command execution priority "1$^{st}$ CMD priority," and may change a write command execution priority and a read command execution priority to a second command execution priority "2$^{nd}$ CMD priority." The command scheduler 500 may schedule the commands according to the second command scheduling method. In a command execution priority "CMD Priority" of the second command scheduling method, as illustrated in FIG. 7E, a trim command "Trim" may have the first command execution priority "1$^{st}$ CMD priority," write command "Write" and a read command "Read" may have the second command execution priority "2$^{nd}$ CMD priority." That is, for example, the trim command "Trim" may be scheduled to be executed prior to the write command "Write" and the read command "Read". Therefore, the command scheduler 500 may schedule the commands in order for the commands to the executed in the order of a first trim command "Trim 1," a second trim command "Trim," a first write command "Write 1," a read command "Read," a second write command "Write 2," and a third write command "Write 3" like a command stream "CMD Stream".

Figure 7F:
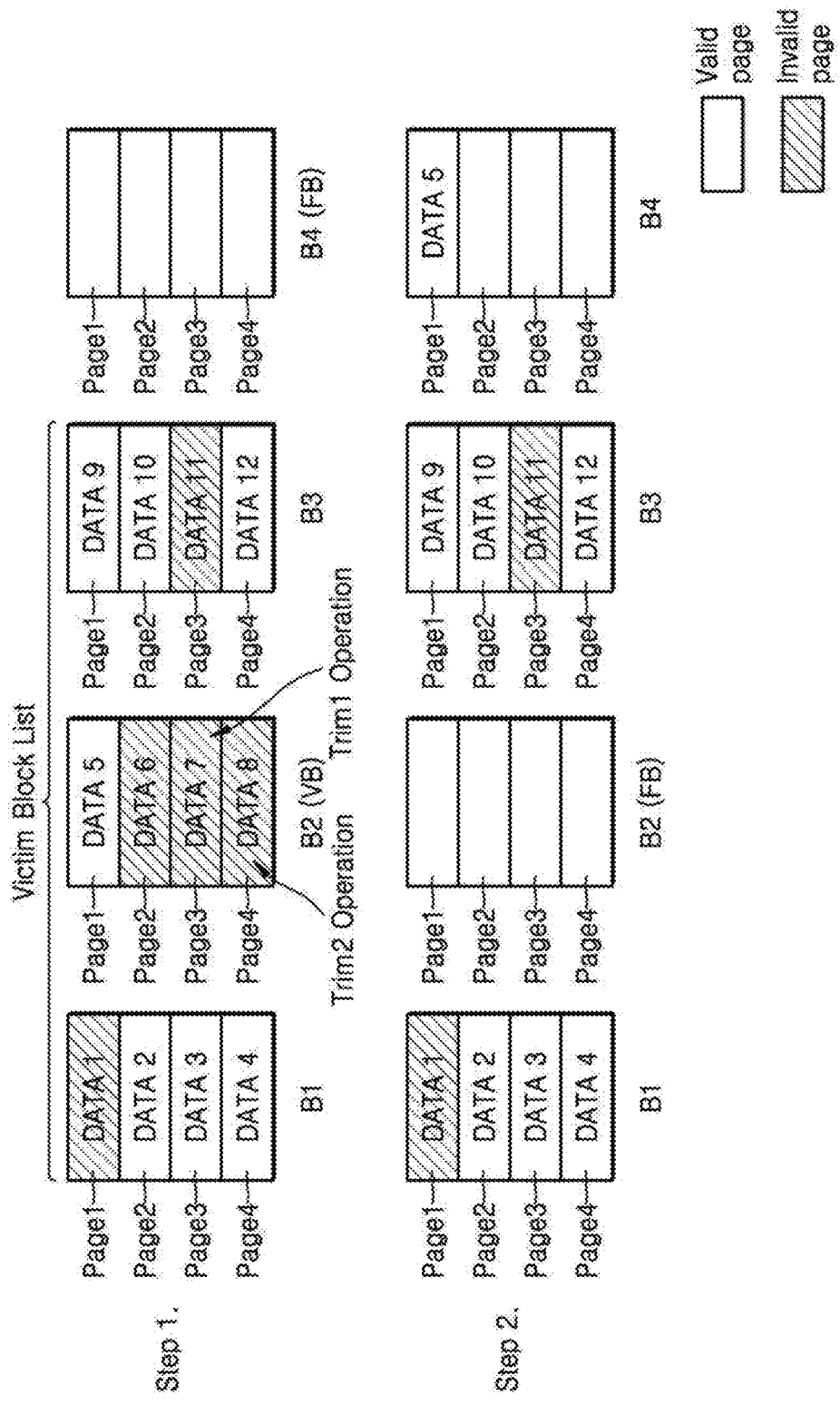

Referring to FIG. 7F, it is illustrated that in a first step "Step 1" and a second step "Step 2", before executing a second write command "Write 2", garbage collection may be performed for securing at least one free block. Unlike FIG. 7B, a third page "Page3" of a second block "B2" of FIG. 7F may be in a state where a page has been changed to an invalid page as an execution result of a first trim command "Trim 1", and a fourth page "Page4" may be in a state where a page has been changed to an invalid page as an execution result of a second trim command "Trim 2". Therefore, in the first step "Step 1", a victim block list may be generated, and the second block "B2" among blocks of the victim block list may be selected as a victim block "VB". In the second step "Step 2", valid data "DATA 5" stored in a valid page "Page1" of the second block "B2" selected as the victim block "VB" may be copied to a fourth block "B4," which is a free block "FB". As described above, valid data stored in three valid pages may be stored in a free block when the garbage collection of FIG. 7B is performed, but when the garbage collection of FIG. 7E is performed, the first trim command "Trim 1" and the second trim command "Trim 2" may be executed prior to the second write command "Write 2", Accordingly, only valid data stored in one valid page may be stored in the free block, and thus, garbage collection is efficiently performed.

FIGS. 8A to 8D and 9A to 9D are diagrams for describing an operation of changing a quota of command execution.

Hereinafter, the command quota manager 540 will be described. Referring to FIG. 1 in conjunction with 8A, the memory controller 110 may receive a plurality of requests in the order of request streams "Req Stream" from the host 100. In an example embodiment, the memory controller 110 may sequentially receive a first write request "Write 1", a second write request "Write 2", a first trim request "Trim 1", a third write request "Write 3", a second trim request "Trim 2", a fourth write request "Write 4", and a fifth write request "Write 5". A plurality of commands respectively corresponding to the plurality of requests may be generated and stored in a command queue. That is, for example, based on a priority of command execution, the write commands "Write 1 to Write 5" may be sequentially stored in a first command execution priority queue "1$^{st}$ CMD priority queue", and the trim commands "Trim 1 to Trim 5" may be sequentially stored in a second command execution priority queue "2$^{nd}$ CMD priority queue".

The command scheduler 500 may schedule the plurality of commands according to a command scheduling method to supply the scheduled commands to the memory device 120 in the order of command streams "CMD Stream". In an example embodiment, the command scheduler 500 may schedule the commands according to a first command scheduling method. In the first command scheduling method, a quota of command execution "CMD Quota A" may correspond to the number of successive executions of the same command to be successively performed among a plurality of commands. That is, for example, based on the quota of command execution "CMD Quota A", two write commands may be successively performed, and one trim command may be performed, Based on the quota of command execution "CMD Quota A" and the priority of command execution "CMD priority", the command scheduler 500 may schedule the commands in order for the commands to be executed in the order of a first write command "Write 1", a second write command "Write 2", a first trim command "Trim 1", a third write command "Write 3", a fourth write command "Write 4", a second trim command "Trim 2", and a fifth write command "Write 5" like a command stream "CMD Stream".

Figure 8A:
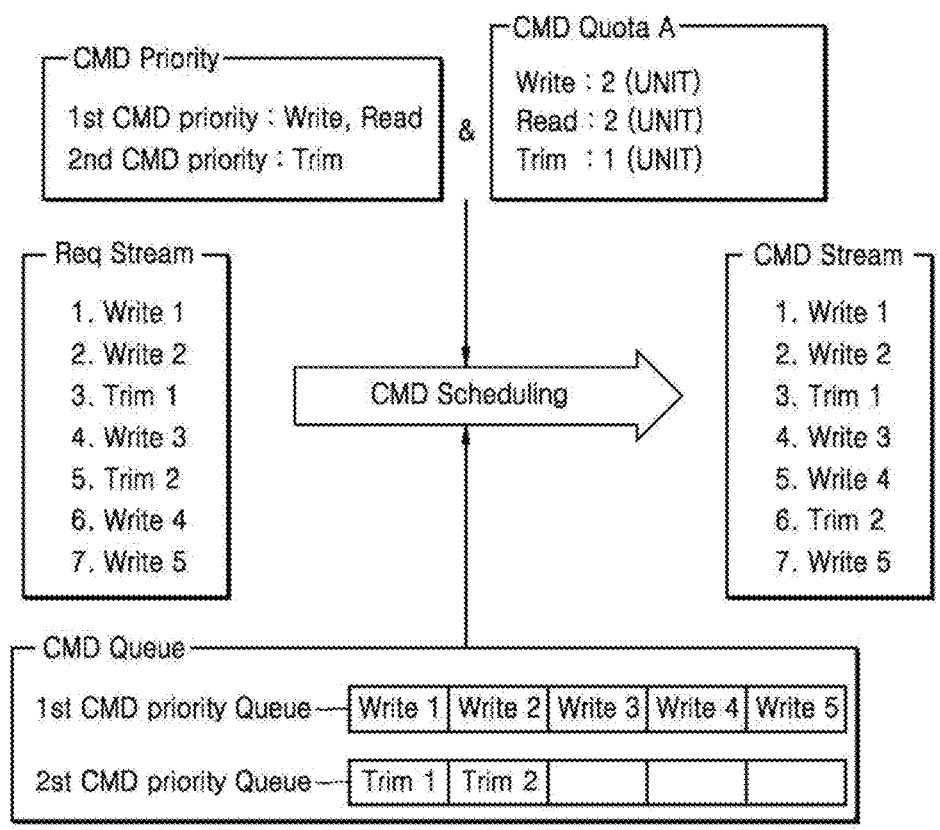
FIGS. 8A to 8D and 9A to 9D are diagrams for describing an operation of changing a quota of command execution.
Figure 8B:
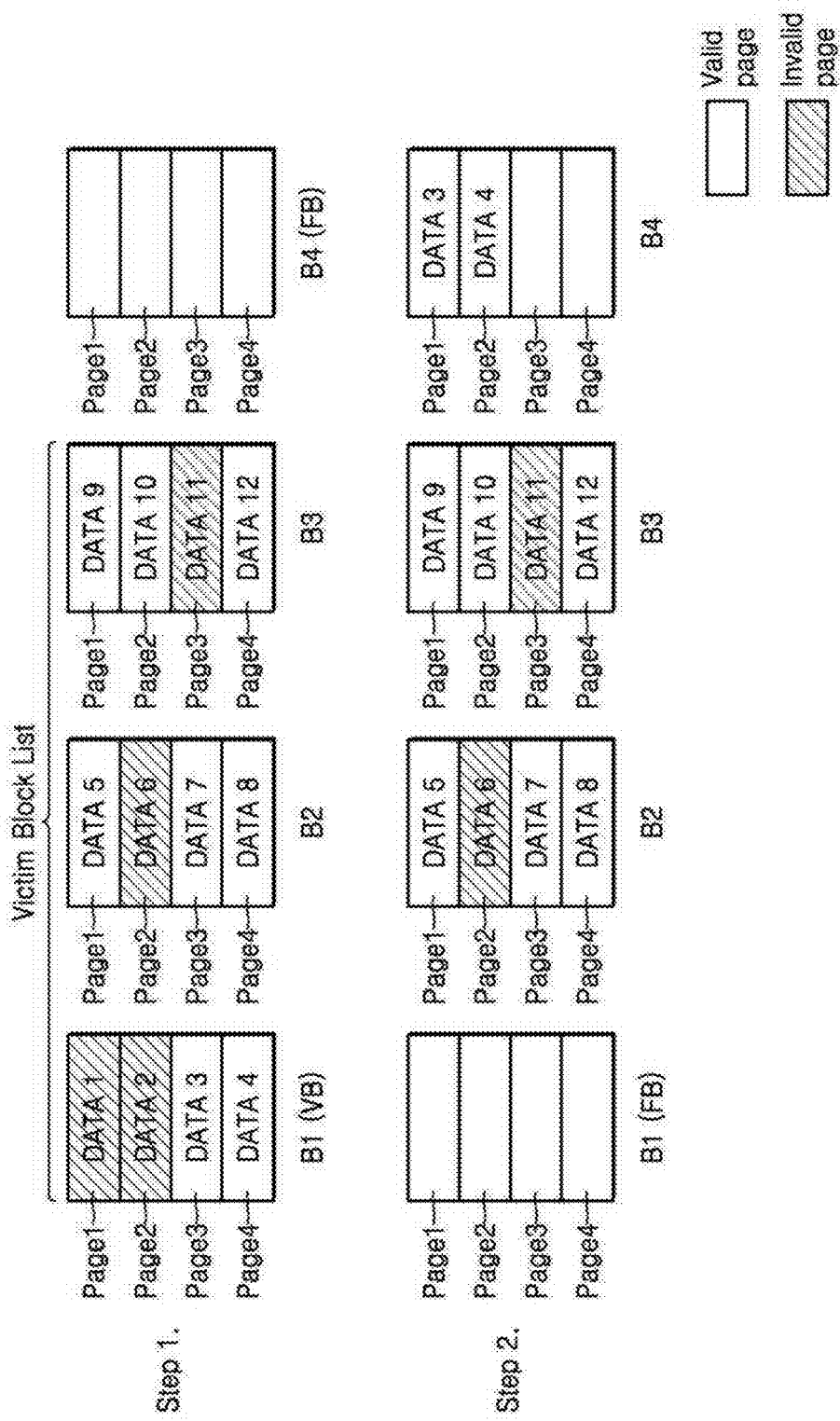

Referring to FIG. 8B, it is illustrated that in a first step "Step 1" and a second step "Step 2", before executing a third write command "Write 3", garbage collection may be performed for securing at least one free block. That is, in the first step "Step 1", a victim block list may be generated, and a first block "B1" among blocks of the victim block list may be selected as a victim block "VB". In the second step "Step 2", valid data "DATA 3" and "DATA 5" stored in valid pages "Page3" and "Page4" of the first block "B1" selected as the victim block "VB" may be copied to a fourth block "B4," which is a free block "FB".

Figure 8C:
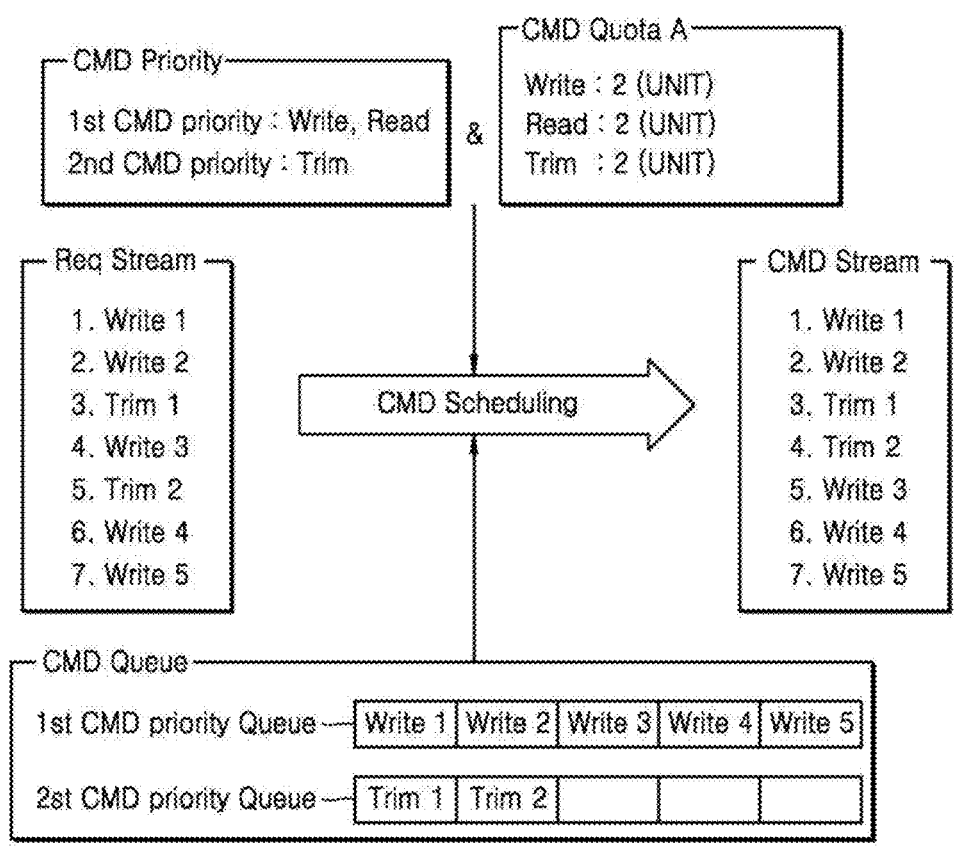

Referring to FIGS. 1, 6 and 8C, the command scheduler 500 may change the first command scheduling method to a second command scheduling method based on the above-described workload level. The command quota manager 540 may change a quota of command execution "CMD Quota A". For example, the number of successive executions of a trim command may be changed to two. In an example embodiment, the command scheduler 500 may schedule the commands according to the second command scheduling method. The command scheduler 500 may schedule the commands in order for the commands to be executed in the order of a first write command "Write 1", a second write command "Write 2", a first trim command "Trim 1", a second trim command "Trim 2", a third write command "Write 3", a fourth write command "Write 4", and a fifth write command "Write 5" like a command stream "CMD Stream", based on command execution according to the second command scheduling method.

Figure 8D:
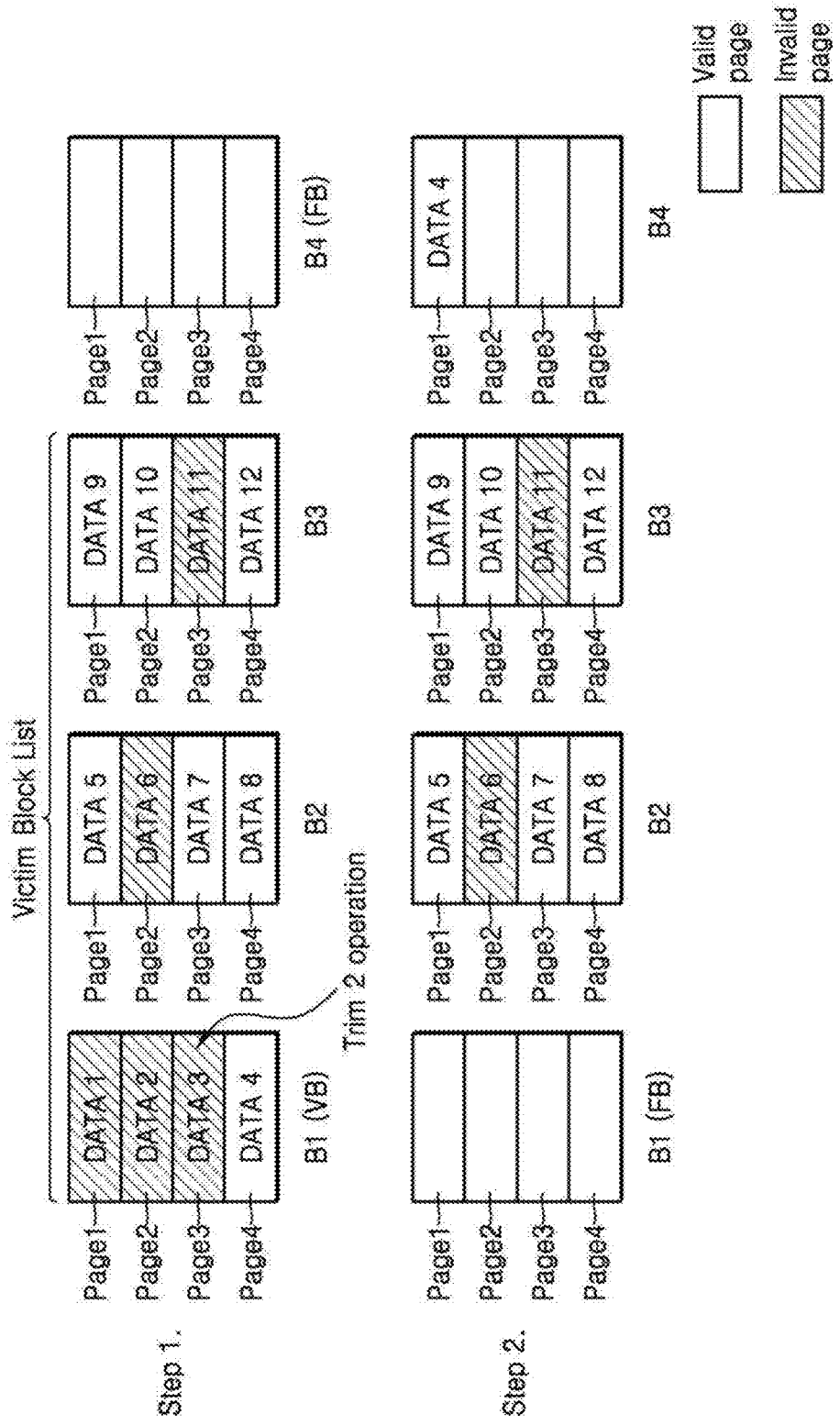

Referring to FIG. 8D, in a first step "Step 1" and a second step "Step 2", before executing a third write command "Write 3", garbage collection may be performed for securing at least one free block. Unlike FIG. 8B, a third page "Page3" of a first block "B1" of FIG. 8D may be in a state where a page has been changed to an invalid page as an execution result of a second trim command "Trim 2". Therefore, in the first step "Step 1", a victim block list may be generated, and a second block "B2" among blocks of the victim block list may be selected as a victim block "VB". In the second step "Step 2", valid data "DATA 4" stored in a valid page "Page4" of the first block "B1" selected as the victim block "VB" may be copied to a fourth block "B4" which is a free block "FB". As described above, valid data stored in three valid pages may be stored in a free block when the garbage collection of FIG. 8B is performed, but when the garbage collection of FIG. 8D is performed, the second trim command "Trim 2" may be first executed. Accordingly, only valid data stored in one valid page may be stored in the free block, and thus, garbage collection is further efficiently performed.

Figure 9A:
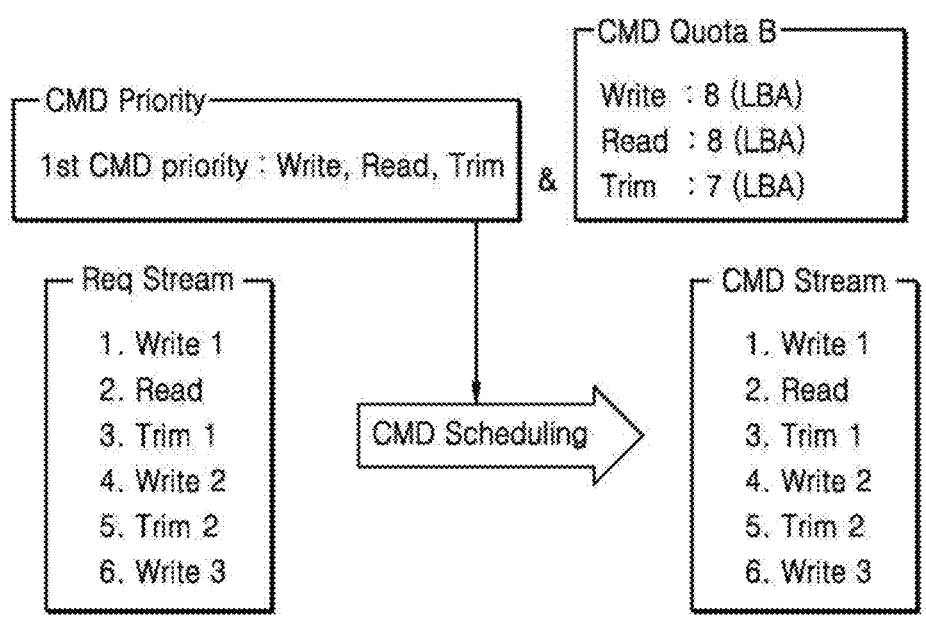

Referring to FIG. 1 in conjunction with FIG. 9A, the memory controller 110 may receive a plurality of requests in the order of request streams "Req Stream" from the host 100. In an example embodiment, the memory controller 110 may sequentially receive a first write request "Write 1", a read request "Read", a first trim request "Trim 1", a second write request "Write 2", a second trim request "Trim 2", and a third write request "Write 3". A plurality of commands corresponding to the plurality of requests may be generated and stored in a command queue.

The command scheduler 500 may schedule the plurality of commands according to a command scheduling method to supply the scheduled commands to the memory device 120 in the order of command streams "CMD Stream". In an example embodiment, the command scheduler 500 may schedule the commands according to a first command scheduling method. In the first command scheduling method, a quota of command execution "CMD Quota A" may correspond to the amount of data which is processed when one command is executed. That is, based on the quota of command execution "CMD Quota A", the amount of data which is processed when one write command or one read command is executed may correspond to 8 (a logical block address (LBA)), and the amount of data which is processed when one trim command is executed may correspond to 7 (LBA). LBA that is a unit of data amount is merely an example embodiment, and may correspond to various units. Hereinafter, it is assumed that 8 (LBA) corresponds to the amount of data stored in one page.

Based on the quota of command execution "CMD Quota A" and the priority of command execution "CMD priority", the command scheduler 500 may schedule the commands in order for the commands to be executed in the order of a first write request "Write 1", a read request "Read", a first trim request "Trim 1", a second write request "Write 2", a second trim request "Trim 2", and a third write request "Write 3" like a command stream "CMD Stream".

Figure 9B:
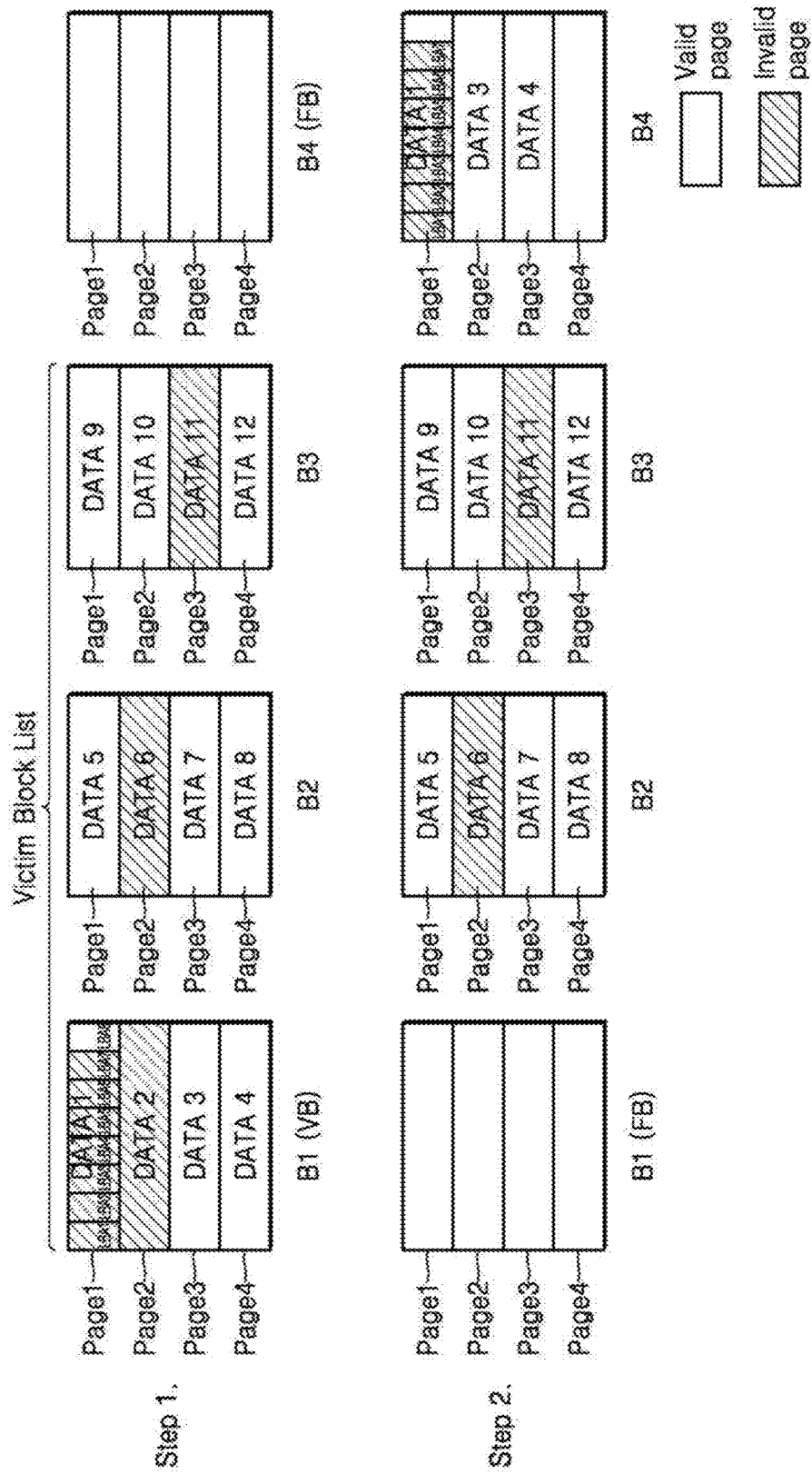
Figure 9C:
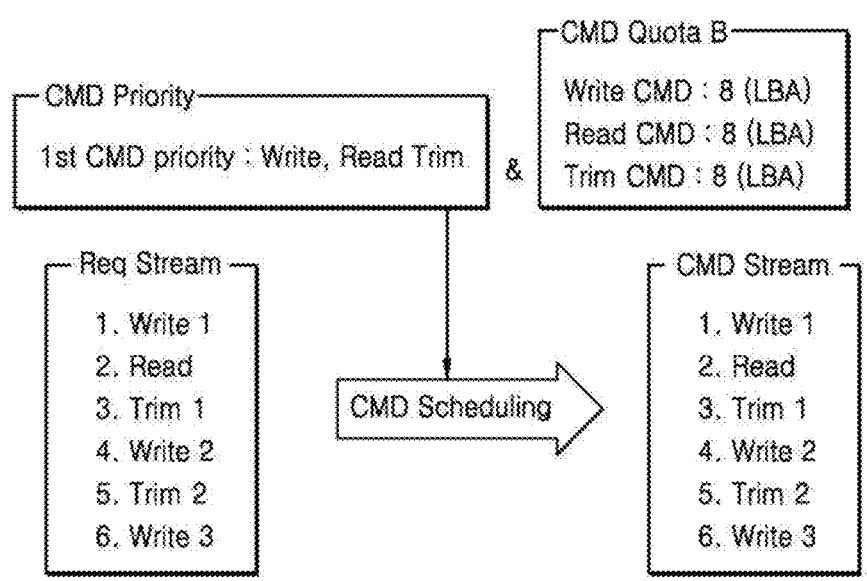

Referring to FIG. 9B, it is illustrated that in a first step "Step 1" and a second step "Step 2", before executing a second write command "Write 2", garbage collection may be performed for securing at least one free block, That is, in the first step "Step 1", a victim block list may be generated, and a first block "B1" among blocks of the victim block list may be selected as a victim block "VB". However, only data equal to 7 (LBA) in first data "DATA 1" stored in a first page "Page1" of the first block "B1" may be changed to invalid data as an execution result of a first trim command "Trim 1". Since all data of the first page "Page1" are not changed to invalid data, in performing garbage collection, the first page "Page1" may correspond to a valid page, and thus, an operation of copying the first data "DATA 1" may be performed. In the second step "Step 2", valid data "DATA 1", "DATA 3" and "DATA 4" respectively stored in valid pages "Page1", "Page3" and "Page4" of the first block "B1" selected as the victim block "VB" may be copied to a fourth block "B4," which is a free block "FB". As described above, data changed to invalid data in the first data "DATA 1" may be unnecessarily copied to a fourth block "B4".

Referring to FIGS. 1, 6 and 7C, the command scheduler 500 may change the first command scheduling method to a second command scheduling method based on the above-described workload level. The command quota manager 540 may change a quota of command execution "CMD Quota A". For example, the amount of data which is processed when one trim command is executed may be changed to 8 (LBA). In an example embodiment, the command scheduler 500 may schedule the commands according to the second command scheduling method.

Figure 9D:
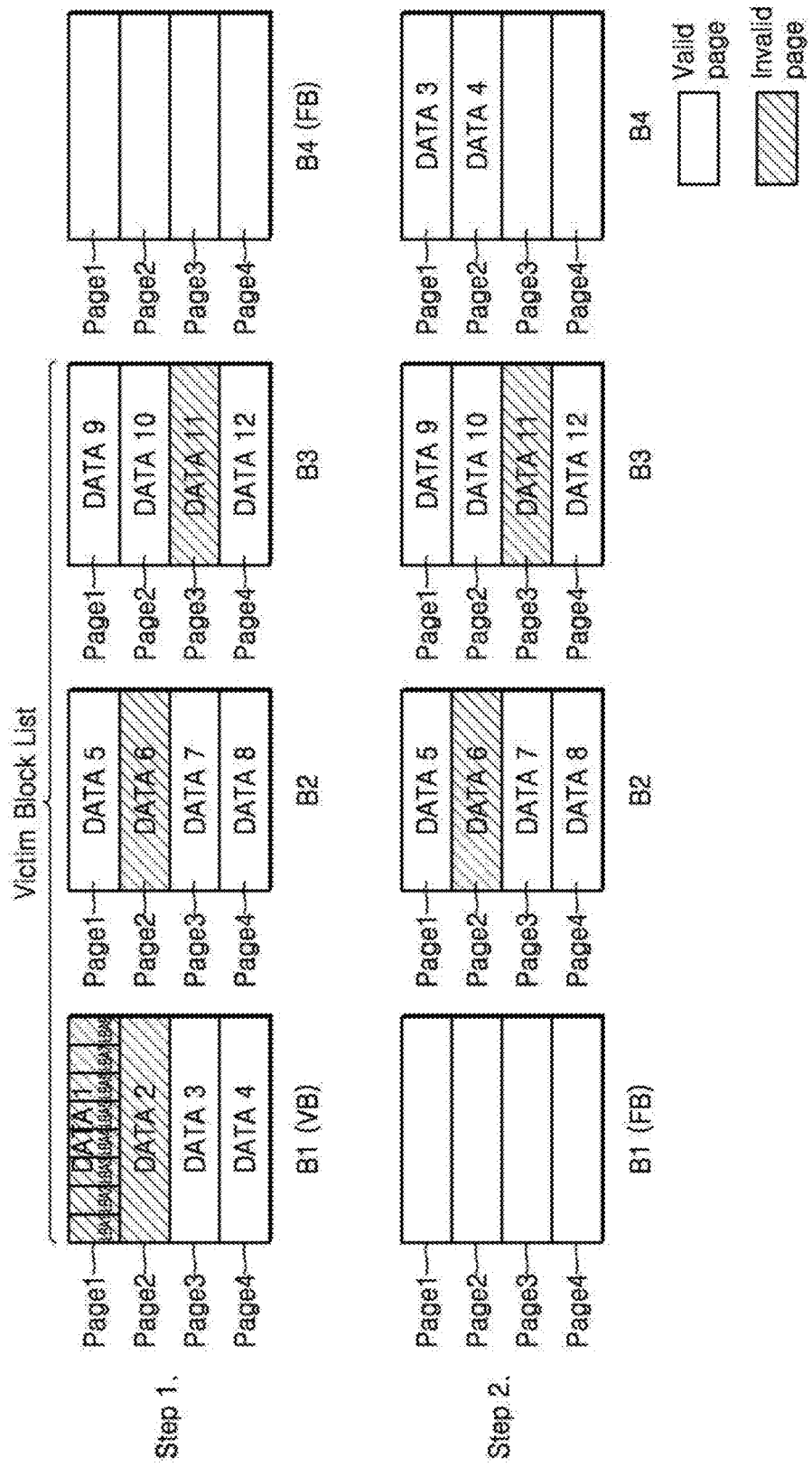

Referring to FIG. 9D, in a first step "Step 1" and a second step "Step 2", before executing a second write command "Write 2", garbage collection may be performed for securing at least one free block. Unlike FIG. 9B, data equal to 8 logical block address (WA) in first data "DATA 1" stored in a first page "Page1" of a first block "B1" may be changed to invalid data as an execution result of a first trim command "Trim 1". Therefore, the first page "Page1" may be changed to an invalid page. In the second step "Step 2", valid data "DATA 3" and "DATA 4" stored in valid pages "Page3" and "Page4" of the first block "B1" selected as the victim block "VB" may be copied to a fourth block "B4," which is a free block "FB". Accordingly, unlike FIG. 9B, in FIG. 9D undesired invalid data is not copied, and garbage collection is efficiently performed.

Figure 10:
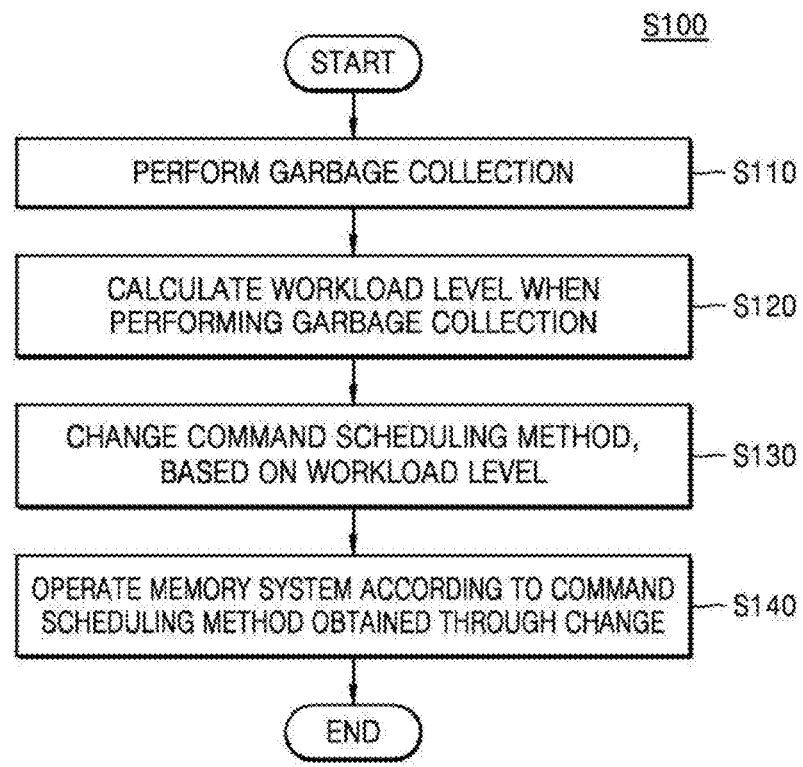
FIG. 10 is a flowchart illustrating a method of operating a memory system according to an example embodiment.

FIG. 10 is a flowchart S100 illustrating a method of operating a memory system, according to an example embodiment. As illustrated in FIG. 10, at S110, garbage collection may be first performed for securing at least one free block at an idle time of a memory system or when performing a write command. At S120, the workload level calculator may calculate a workload level when performing the garbage collection. However, the workload level may be calculated at a certain period as well as when performing the garbage collection. At S130, the command scheduler may change a command scheduling method based on the calculated workload level. That is, for example, when the workload level is equal to or higher than a reference level, the command scheduler may change the command scheduling method. Subsequently, at S140 the memory system may operate according to a command scheduling method obtained through the change.

Figure 11:
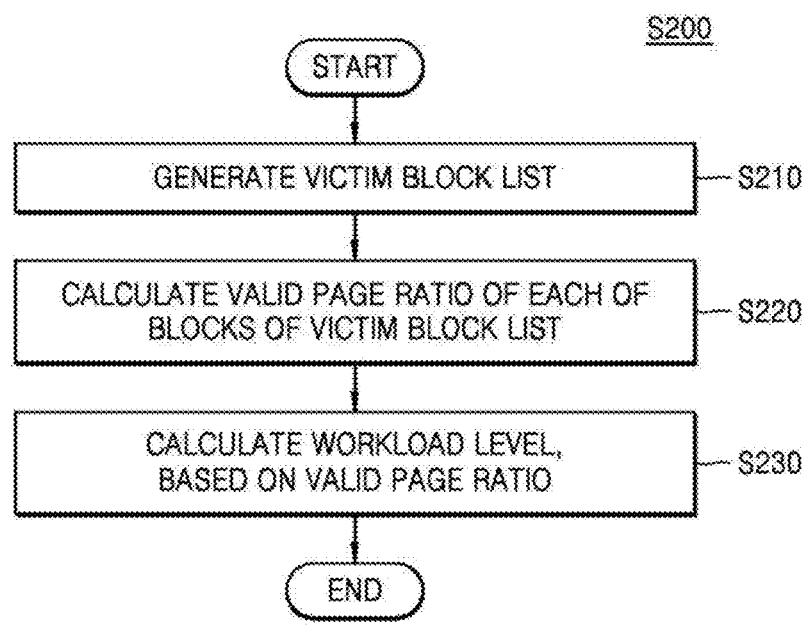
FIG. 11 is a flowchart illustrating a method of calculating a workload level according to an example embodiment.

FIG. 11 is a flowchart S200 illustrating a method of calculating a workload level, according to an example embodiment. First, at S210, N number of blocks having low garbage cost may be detected, and a victim block list may be generated by using the detected N blocks. At S220, the workload level calculator may calculate the valid page ratios or total number of blocks of the victim block list. At S230, the workload level calculator may calculate the calculated valid page ratios or total number of the blocks of the victim block list. However, the calculated valid page ratios or number of the blocks of the victim block list may be treated as a workload level without a separate calculation operation. In another example embodiment, the workload level calculator may calculate the ratio or number of non-free blocks and may calculate the workload level by using the calculated ratio or number of non-free blocks.

Figure 12:
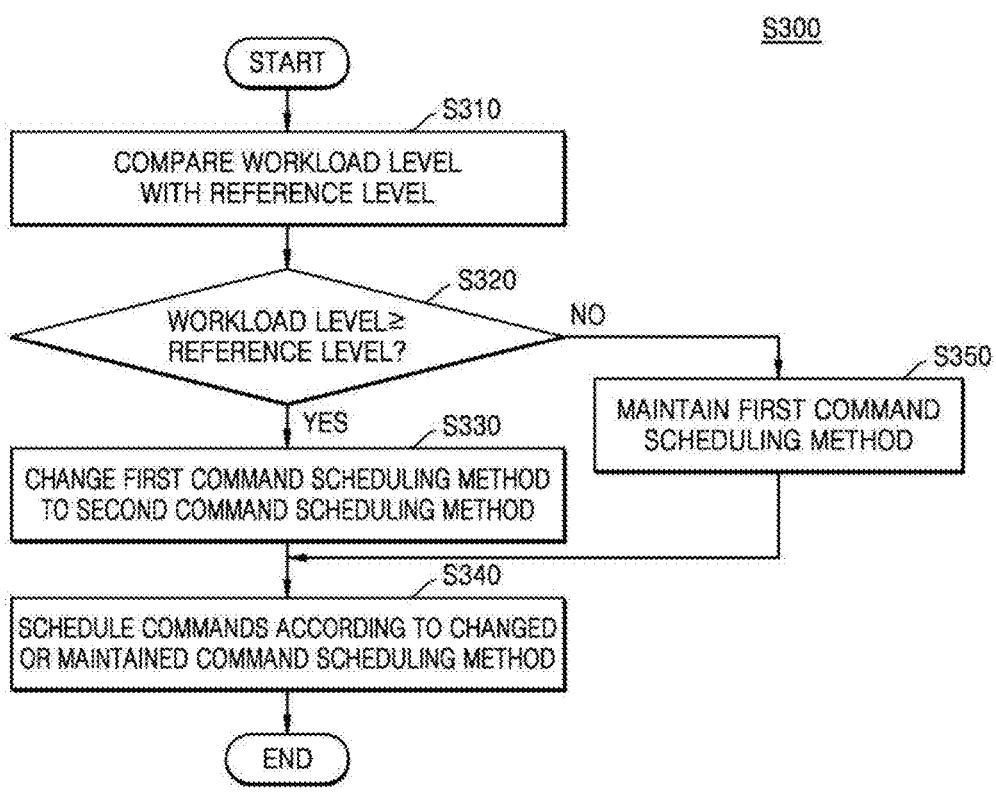
FIG. 12 is a flowchart illustrating a method of changing a command scheduling method according to an example embodiment.

FIG. 12 is a flowchart S300 illustrating a method of changing a command scheduling method, according to an example embodiment. As illustrated in FIG. 12, at S310, the command scheduler may first compare a calculated workload level with a reference level. When the workload level is substantially equal to and/or higher than the reference level, the command scheduler may change a first command scheduling method to a second command scheduling method at S330 (YES). A memory system may operate according to the second command scheduling method at S340, thereby performing further efficient garbage collection than the first command scheduling method. On the other hand, when the workload level is lower than the reference level at S320 (NO), the memory system may operate according to the first command scheduling method at S340. The command scheduling method, as described above, may denote scheduling a command based on at least one of a priority of command execution and a quota of command execution. The second command scheduling method may be obtained by changing at least one of a priority of command execution and a quota of command execution of the first command scheduling method.

Figure 13:
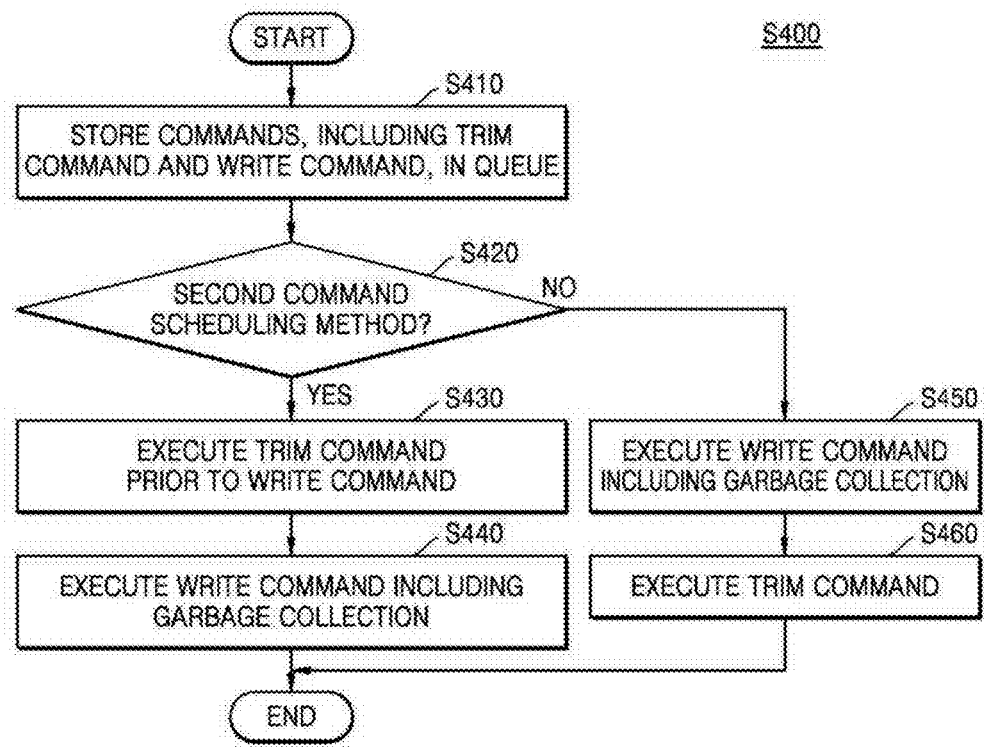
FIG. 13 is a flowchart illustrating a memory system operating method based on a changed command scheduling method according to an example embodiment.

FIG. 13 is a flowchart S400 illustrating a memory system operating method based on a changed command scheduling method according to an example embodiment.

As illustrated in FIG. 13, at S410, the memory system may first store a plurality of commands in a command queue, including a trim command and a write command that are generated in response to a plurality of requests from a host. When the memory system operates according to a second command scheduling method obtained by changing a first command scheduling method at S420 (YES), for example, the memory system may execute the write command prior to the trim command at S430. That is, for example, the memory system may change valid data, stored in a memory device, to invalid data by executing the trim command, Subsequently, at S440, the memory system may perform garbage collection and may execute the write command, for securing at least one free block. When the memory system operates according to the first command scheduling method at S420 (NO), the memory system may perform the garbage collection and may execute the write command for securing at least one free block at S450. Subsequently, at S460, the memory system may execute the trim command. As described above, when the memory system is based on the second command scheduling method, the memory system may preferentially execute the trim command to previously change valid data to invalid data, and thus, only valid data which is not changed to invalid data may be copied to a free block, thereby enabling garbage collection to be efficiently performed.

Figure 14:
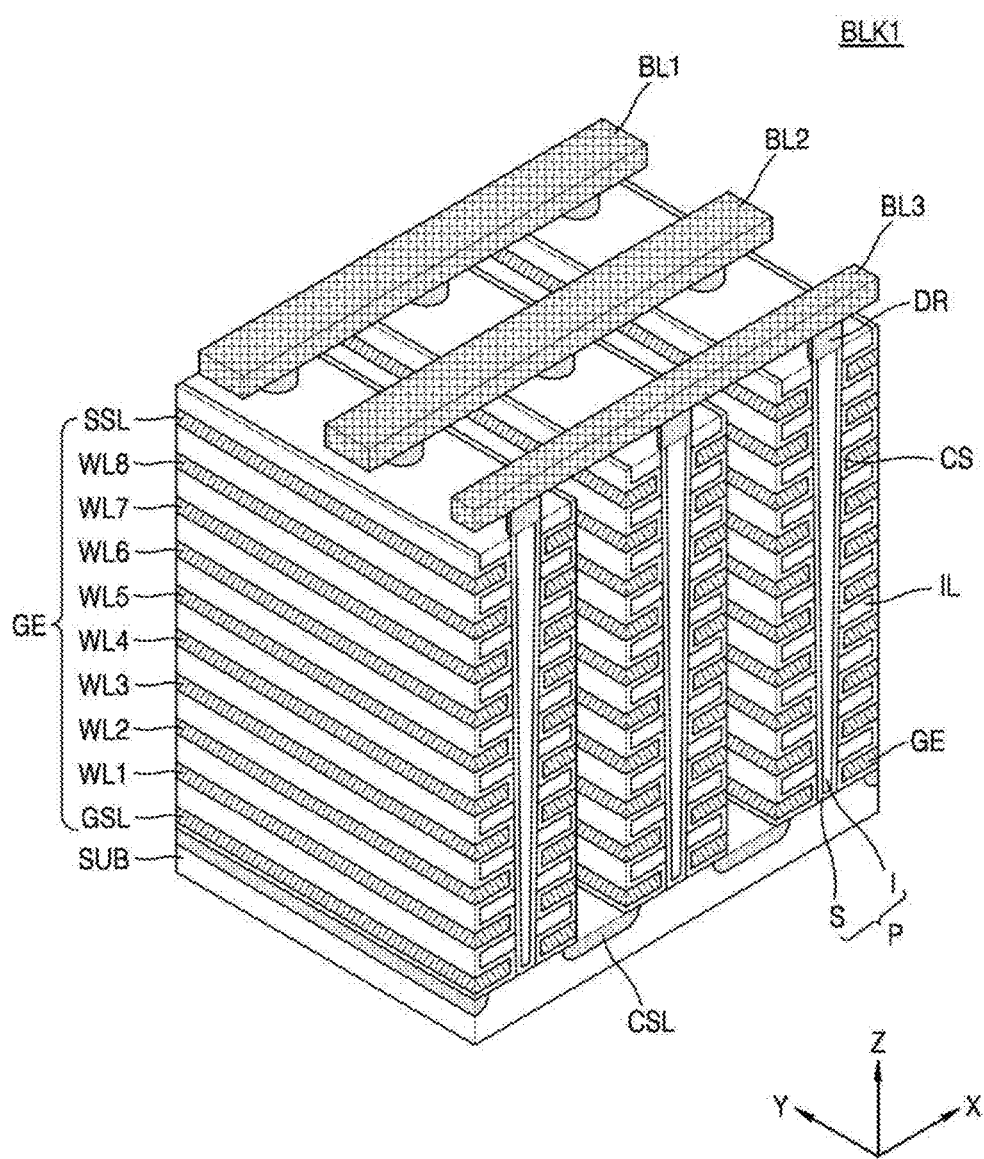
FIG. 14 is a structure diagram illustrating an implementation example of a memory cell array of a memory device of FIG. 1.

FIG. 14 is a structure diagram illustrating an example embodiment of a memory cell array of the memory device of FIG. 1.

The memory cell array may include a plurality of blocks, and each of the blocks may have a three-dimensional (3D) structure (or a vertical structure). In an example embodiment, each of the blocks may include structures which extend along first to third directions. That is, for example, in a flash memory device, a plurality of cell blocks may each include a plurality of NAND strings that extend along the third direction. In an example embodiment, the plurality of NAND strings may be provided to be spaced apart from each other by a certain distance along the first and second directions. FIG. 14 illustrates a structure diagram corresponding to one block BLK1. Also, the block BLK1 may be a block included in a meta area, or may be a block included in a storage area.

Still referring to FIG. 14, the cell block BLK1 may be formed in a direction vertical to a substrate SUB. In FIG. 14, the cell block BLK1 is illustrated as including two selection lines GSL and SSL, eight word lines WL1 to WL8, and three bit lines BL1 to BL3, but the number of the lines may be variously changed.

The substrate SUB may have a first conductive type (for example, a p type), and a common source line CSL that extends along the first direction (for example, a Y direction), and is doped with impurities having a second conductive type (for example, an n type) may be provided on the substrate SUB. A plurality of insulation layers IL that extend along the first direction may be sequentially provided along the third direction (for example, a Z direction) in a region of the substrate SUB between two adjacent common source lines CSL, and may be spaced apart from each other along the third direction. For example, the plurality of insulation layers IL may each include an insulating material such as silicon oxide and/or the like.

A plurality of pillars P, which are sequentially arranged along the first direction and pass through the plurality of insulation layers IL along the third direction, may be provided in a region of the substrate SUB between two adjacent common source lines CSL. For example, the plurality of pillars P may contact the substrate SUB through the plurality of insulation layers IL, In an example embodiment, a surface layer S of each of the pillars P may include silicon having a first type and may function as a channel region. Also, an inner layer I of each of the pillars P may include an insulating material, such as silicon oxide and/or the like, or an air gap.

A charge storage layer CS may be provided along the insulation layers IL, the pillars P, and an exposed surface of the substrate SUB and in a region of the substrate SUB between two adjacent common source lines CSL. The charge storage layer CS may include a gate insulation layer (or referred to as a tunneling insulation layer), a charge trap layer, and a blocking insulation layer. For example, the charge storage layer CS may have an oxide-nitride-oxide (ONO) structure. Also, a gate electrode GE including the selection lines GSL and SSL and the word lines WL1 to WL8 may be provided on an exposed surface of the charge storage layer CS and in a region between two adjacent common source lines CSL.

Drains or drain contacts DR may be respectively provided on the plurality of pillars P. For example, the drains or drain contacts DR may each include silicon on which impurities having the second conductive type are doped. The bit lines BL1 to BL3, which extend in the second direction (for example, an X direction) and are arranged to be spaced apart from each other by a certain distance along the first direction may be provided on the drains DR.

U.S. Pat. Nos. 7,679,133, 8,553,466, 8,654,587 and 8,559,235 and U.S. Patent Application No. 2011/0233648 disclose appropriate elements of a three-dimensional (3D) memory array, which include a plurality of levels and in which word lines and/or bit lines are shared between the plurality of levels. In the present specification, the reference documents may be combined through citation.

Figure 15:
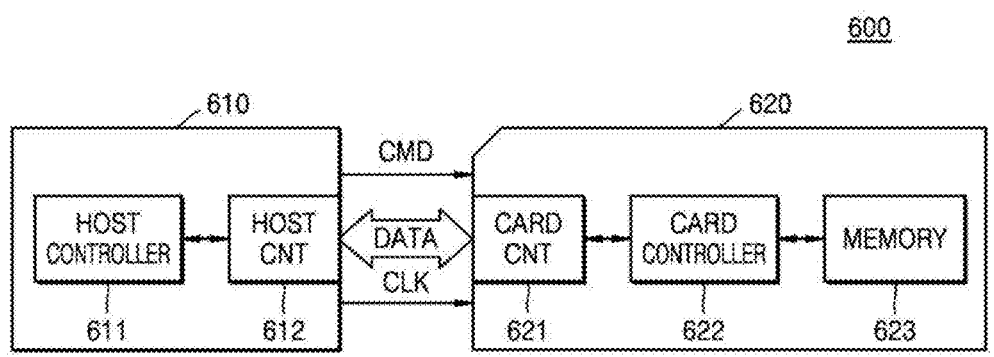
FIG. 15 is a block diagram illustrating an example where a memory system according to an example embodiment is applied to a memory card system.

FIG. 15 is a block diagram illustrating an example where the memory system according to an example embodiment is applied to a memory card system 600. For example, the memory system is assumed as a flash memory system.

Referring to FIG. 15, the memory card system 600 may include at least a host 610 and a memory card 620. The host 610 may include a host controller 611 and a host connector 612. The memory card 620 may include a card connector 621, a card controller 622, and a memory system 623, In an example embodiment, the memory system 623 may be implemented by using the example embodiments of FIGS. 1 to 13. Therefore, the memory system 623 changes a command scheduling method to perform efficient garbage collection, based on the workload level according to the example embodiments.

The host 610 may write data in the memory card 620 and/or may read the data stored in the memory card 620. The host controller 611 may transmit a command CMD, a clock signal CLK generated by a clock generator (not shown) included in the host 610, and data DATA to the memory card 620 through the host connector 612.

In response to a request received through the card connector 621, the card controller 622 may supply data to the memory system 623 in synchronization with a clock signal generated by a clock generator (not shown) included in the card controller 622. The memory system 623 may store data transmitted from the host 610.

The memory card 620 may be implemented with a compact flash card (CFC), a Microdrive, a smart media card (SMC), a multimedia card (MMC), a security digital card (SDC), a universal flash storage device (UFS), a memory stick, an USB flash memory driver, and/or the like.

Figure 16:
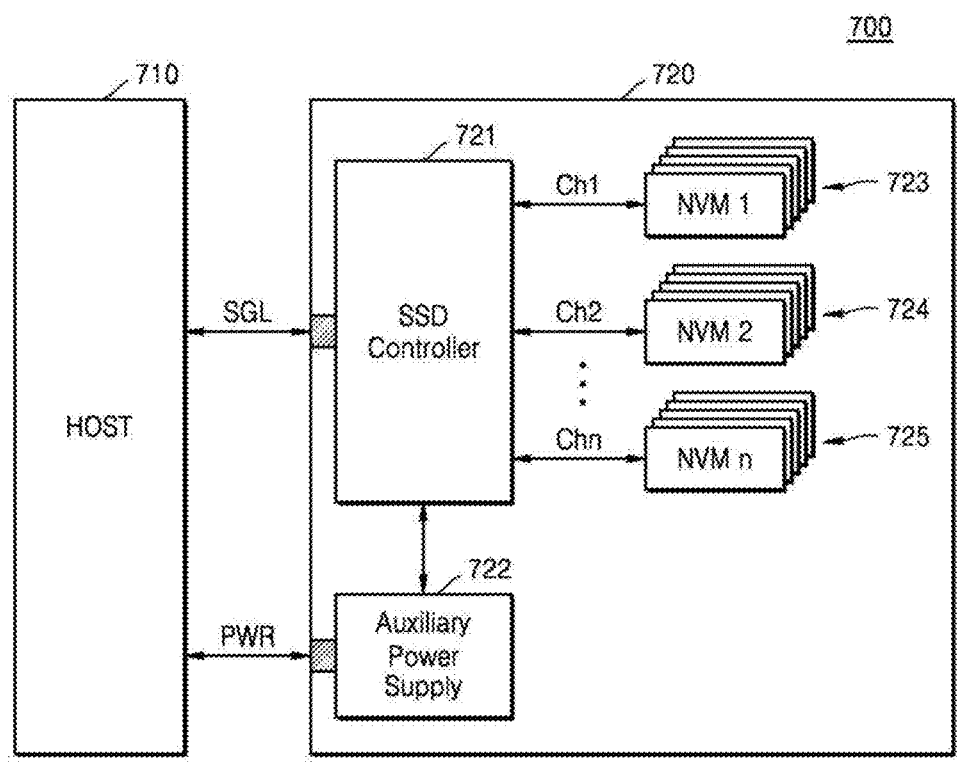
FIG. 16 is a block diagram illustrating an example where a memory system according to example embodiments is applied to an SSD system.

FIG. 16 is a block diagram illustrating an example where the memory system according to example embodiments is applied to an SSD system 700.

Referring to FIG. 16, the SSD system 700 may include a host 710 and an SSD 720. The SSD 720 may transmit or receive a signal to or from the host 710 through a signal connector and may be supplied with power through a power connector. The SSD 720 may include an SSD controller 721, an auxiliary power supply 722, and a plurality of nonvolatile memory systems 723 to 725. Each of the nonvolatile memory systems 723 to 725 may include the memory device according to the example embodiments. According to an example embodiment, therefore, each of the nonvolatile memory systems 723 to 725 changes a command scheduling method to perform efficient garbage collection, based on the workload level according to the example embodiments.

The memory controller 110, the CMD scheduler 115a, the work load calculator 115b, the working memory 220, the garbage collector 223, the processor 210, the control logic 320, the workload calculator 400, the valid page ratio calculator 420, the non-free ratio calculator 440, the command scheduler 500, the CMU priority manager 520, the CMD quota manager 540, the host controller 611, and the card controller 622 are either implemented using hardware components, a processor executing software components, or a combination thereof. Upon execution of one or more algorithms, described in example embodiments of inventive concepts, the aforementioned hardware components, or processor executing software components, result in a special purpose processor.

Algorithms, as presented in example embodiments of inventive concepts, constitutes sufficient structure, that may comprise of, including but not limited to, mathematical formulas, flow charts, computer codes, and/or necessary steps, which upon execution result in a special purpose computer that is programmed to perform the disclosed algorithms in example embodiments of inventive concepts.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While inventive concepts have been particularly shown and described with reference to example embodiments thereof, it will be understood that various changes in form and details may be made therein without departing from the spirit and scope of the following claims.

What is claimed is:

1. A method of operating a memory system, the method comprising:
    performing garbage collection on a plurality of blocks for securing a free block;
    calculating a workload level for the performing garbage collection;
    changing a command schedule based on the calculated workload level; and
    executing a plurality of commands based on a priority order; and
    wherein the changing the command schedule includes changing the priority order when the workload level is equal to or higher than a reference level.

2. The method of claim 1, wherein
    the performing garbage collection further comprises,
        generating a victim block list based on the plurality of blocks such that the victim block list includes a victim block, the garbage collection being performed on the victim block; and
    the calculating the workload level is based on at least one of valid page ratios or a number of valid pages of the plurality of blocks of the victim block list.

3. The method of claim 2, wherein the generating the victim block list includes detecting N number of blocks in an ascending order of garbage collection costs, N is a natural number.

4. The method of claim 1, wherein the calculating the workload level further comprises:
    calculating a number of non-free blocks among the plurality of blocks; and
    calculating the workload level based on the number of the non-free blocks.

5. The method of claim 1, wherein the changing the priority order includes changing an execution priority of a trim command of the plurality of commands to a priority equal to or higher than an execution priority of a write command of the plurality of commands.

6. The method of claim 1, further comprising:
    executing a plurality of commands based on a desired command quota, and
    wherein the changing the command schedule includes changing the desired command quota when the workload level is equal to or higher than the reference level.

7. The method of claim 6, wherein
    the desired command quota corresponds to an amount of data processed when executing at least one command of the plurality of commands, and
    the changing the desired command quota includes changing the amount of data, the amount of data is processed when executing a trim command of the plurality of commands.

8. The method of claim 6, further comprising:
changing a number of successive executions of a trim command of the plurality of commands when the workload level is equal to or higher than the reference level, and
wherein the desired command quota corresponds to a number of successive executions of a same command of the plurality of commands of the plurality of commands.

9. The method of claim 1, wherein the changing the command schedule changes an order of at least one of a trim command, a read command and a write command.

10. A memory scheduling method, comprising:
changing a first command schedule to a second command schedule based on a workload level, the workload level calculated when performing a first garbage collection; and
scheduling execution of a plurality of commands based on the second command schedule,
wherein the changing the first command schedule to the second command schedule includes changing at least one of an execution priority of a trim command of the plurality of commands and an execution quota of the trim command.

11. The memory scheduling method of claim 10, wherein the workload level is calculated based on at least one of valid page ratios or a number of valid pages of the plurality of blocks of a victim block list, the victim block list includes at least one victim block, the first garbage collection is performed on the victim block.

12. The memory scheduling method of claim 10, wherein the changing the second command schedule to the first command schedule is based on the workload level, the workload level is calculated when performing a second garbage collection.

13. The memory scheduling method of claim 10,
wherein the scheduling schedules the execution of the plurality of commands prior to performing the first garbage collection, and
wherein the plurality of commands include a trim command and a write command.

14. The memory scheduling method of claim 10, wherein the execution quota of the trim command corresponds to at least one of (i) an amount of data processed when executing the trim command, and (ii) a number of successive executions of the trim command that are successively executed.

15. The memory scheduling method of claim 10, wherein the changing the first command schedule to the second command schedule changes an order of at least one of the trim command, a read command and a write command.

* * * * *